US009407743B1

(12) United States Patent
Hirshberg

(10) Patent No.: US 9,407,743 B1
(45) Date of Patent: Aug. 2, 2016

(54) HANDHELD CELL PHONE PROTECTOR CASE WITH ADJUSTABLE STRAP TO FACILITATE SECURELY HOLDING THE CELL PHONE PROTECTOR CASE AND ALSO RETAIN THE CELL PHONE PROTECTOR CASE ON A BODY PART

(71) Applicant: Jonathan S. Hirshberg, Manhattan Beach, CA (US)

(72) Inventor: Jonathan S. Hirshberg, Manhattan Beach, CA (US)

(73) Assignee: JR286 Technologies, Inc., Torrance, CA (US)

(*) Notice: Subject to any disclaimer, the term of this patent is extended or adjusted under 35 U.S.C. 154(b) by 0 days.

(21) Appl. No.: 14/284,715

(22) Filed: May 22, 2014

Related U.S. Application Data

(60) Provisional application No. 61/880,770, filed on Sep. 20, 2013.

(51) Int. Cl.
*H04M 1/04* (2006.01)
*A45F 5/00* (2006.01)
*H04M 1/18* (2006.01)
*F16M 13/04* (2006.01)

(52) U.S. Cl.
CPC . *H04M 1/04* (2013.01); *A45F 5/00* (2013.01); *H04M 1/185* (2013.01); *A45F 2200/0516* (2013.01); *F16M 13/04* (2013.01)

(58) Field of Classification Search
CPC .............. A42B 3/00; A42B 3/30; A61F 5/48; B60N 2002/2815; B60N 2002/2818; B60N 2/2812; B60N 2/2839; B60N 2/4249; A45F 2005/008; A45F 5/00; A45F 2200/05; A45F 2000/0516; H01M 2/043; H01M 2/12; A45C 9/00; B65D 2585/88; B65D 5/505; B65D 77/26; H04M 1/05; H04R 1/1075; H05K 5/0086
See application file for complete search history.

(56) References Cited

U.S. PATENT DOCUMENTS

| | | | |
|---|---|---|---|
| 6,837,435 | B2 | 1/2005 | Kehoe et al. |
| 8,480,144 | B2 | 7/2013 | Potter et al. |
| 2011/0309117 | A1 | 12/2011 | Roberts |
| 2012/0187706 | A1 | 7/2012 | Kannaka |
| 2012/0200102 | A1 | 8/2012 | McMeans |
| 2012/0261930 | A1 | 10/2012 | Bethea |
| 2012/0299318 | A1 | 11/2012 | Murphy et al. |
| 2012/0302294 | A1 | 11/2012 | Hammond et al. |
| 2013/0009413 | A1 | 1/2013 | Chiu et al. |
| 2013/0069381 | A1 | 3/2013 | Sakamoto |
| 2013/0069499 | A1 | 3/2013 | Modrell |

*Primary Examiner* — Nizar Sivji
(74) *Attorney, Agent, or Firm* — Thomas I. Rozsa

(57) ABSTRACT

A cell phone protector case with a chamber to press fit retain a cell phone and an adjustable low profile strap retained on the cell phone protector case to enable a grip on a hand between a rear surface of the cell phone protector case and strap to be adjustable for a tight grip. The strap also has reflective strips and a reflective pull tab to enable the cell phone protector case to be used in low light.

20 Claims, 22 Drawing Sheets

HANDHELD CELL PHONE PROTECTOR CASE WITH ADJUSTABLE STRAP TO FACILITATE SECURELY HOLDING THE CELL PHONE PROTECTOR CASE AND ALSO RETAIN THE CELL PHONE PROTECTOR CASE ON A BODY PART

This patent application claims priority to Provisional Application No. 61/880,770 filed on Sep. 20, 2013.

BACKGROUND OF THE INVENTION

1. Field of the Invention

The present invention relates to the field of cell phone protector cases in which a cell phone is carried in a manner which enables a user to operate the cell phone for talking and operating other computer applications contained within the cell phone.

2. Description of the Prior Art

In general, many types of cell phone protector cases exist in the prior art. The following 11 patents and published patent applications are the closest prior art to the present invention.

1. U.S. Pat. No. 6,837,435 B2 issued to Timothy Kehoe et al. on Jan. 4, 2005 for "Adapter Unit Having a Handle Grip for a Personal Digital Assistant" (hereafter the "Kehoe Patent");
2. United States Published Patent Application No. 2011/0309117 issued to Kyle Roberts on Dec. 22, 2011 for "Holding Case for Portable Electronic Devices" (hereafter the "Roberts Published Patent Application");
3. United States Published Patent Application No. 2012/0187706 issued to Robert E. Kannaka on Jul. 26, 2012 for "Hand Grip for Electronic Devices" (hereafter the "Kannaka Published Patent Application");
4. United States Published Patent Application No. 2012/0200102 issued to Jan McMeans on Aug. 9, 2012 for "Hand Attachment to Mobile Devices" (hereafter the "McMeans Published Patent Application");
5. United States Published Patent Application No. 2012/0261930 issued to Webelene Bethea on Oct. 18, 2012 for "Holding Device for Phone or Other Electronic Device" (hereafter the "Betheu Published Patent Application");
6. United States Published Patent Application No. 2012/0299318 issued to John A. Murphy et al. on Nov. 29, 2012 for "Elastic Finger Strap and Surface Mount for Electronic Device" (hereafter the "Murphy Published Patent Application");
7. United States Published. Patent Application No. 2012/0302294 issued to Alexander Hays Hammond et al. on Nov. 29, 2012 for "Illuminated Cell Phone Case" (hereafter the "Hammond Published Patent Application");
8. United States Published Patent Application No. 2013/0009413 issued to Herbert Chiu, Jr. et al. on Jan. 10, 2013 for "Multifunctional Strap System for Handheld Portable Electronic Devices" (hereafter the "Chiu Published Patent Application");
9. United States Published Patent Application No. 2013/0069381 issued to Mitsuru Sakamoto on Mar. 21, 2013 for "Carrying Case" (hereafter the "Sakamoto Published Patent Application");
10. United States Published Patent Application No. 2013/0069499 to Paul Modrell on Mar. 21, 2013 for "Modular Case and Componentry for handheld Electronic Devices" (hereafter the "Modrell Published Patent Application");

11. U.S. Pat. No. 8,480,144 to Christine Potter et al. on Jul. 9, 2013 for "Holding Aid for a Personal, Hand-Held, Tablet-Shaped Device, and Methods of Use" (hereafter the "Potter Patent");

The Kehoe Patent discloses an "Adapter Unit Having a Handle Grip for a Personal Digital. Assistant" which would include a cell phone. Referring to Column 3, Lines 20-30, the patent states:

> "In another preferred embodiment the invention includes an adapter unit having a gripping surface that enhance the ergonomics of the adapter and helps prevent the adapter from shipping out of a user's hand. In another preferred embodiment the invention includes an adapter unit having a gripping surface that enhances the comfort to a user using a personal digital assistant."

Also referring to Column 3, Line 37, the Kehoe Patent states "A strap can also be added on the back of the adapter for ergonomic and comfort reasons." FIG. 5 illustrates an adapter and a hand strap according to the invention. Referring to Column 7 beginning on Line 39, the patent states "FIG. 5 illustrates an adapter having a hand strap 130. Hand strap 130 is attached to the top of the adapter and allows the operator to carry the device without worrying about dropping it. The adapter, which is typically made out of plastic material, can have a rubber over-mold with a finger grip designed into it."

The Kehoe Patent discloses the concept of a handle but to a large extent, it deals with a device that is considered a high technology device and a lot of the features of the invention are actually electronics of what is contained in the product.

The Roberts Published Patent Application discloses a "Holding Case for Portable Electronic Devices". The published patent application discloses:

> "The presently disclosed holding case allows a user to hold a portable electronic device with a single finger, allowing the user to keep the device in a convenient and handy position for use. The device comprises a flat, flexible strap which fits along the backing to a device or device case. The strap adjustably slides into two slots placed on opposing sides of the case. On the inside of the device casing or backing, the strap slides along a raised track. One end of the strap further comprises horizontal ridges across its tail portion, which partially lock into matching grooves in the case. This permits the strap to be temporarily locked in an open position for reception of any finger and to securely hold a device in place. When not in use, a slight touch causes the strap to retract back to its default flat position."

The strap disclosed in the Roberts Published Patent Application is at an angle and this makes it difficult to securely grasp the cell phone protector case.

The Kannaka Published Application discloses a "Hand Grip for Electronic Devices". Specifically the Published Application discloses:

> "A hand grip for an electronic device is disclosed. An example hand grip may include a backing removably attachable to a back side of the electronic device by stretching over opposite edge portions of the electronic device. The hand grip may also include a handle member connecting with the backing. The handle member connects with one or more finger of a user to securely hold the handheld electronic device by the hand of the user."

The McMeans Published Application discloses:

> "A hand attachment for a wireless device comprises a material that affixes to a back surface of the wireless device or wireless device case and one or more fasteners for affixing the material to the wireless device or wireless device case. A user's hand slips between the material and the wireless device or wireless device case to provide the user the ability to hold and use the wireless device."

A further object of the McMeans Published Application is to provide a hand attachment that affixes to the back of a wireless device or a wireless device case wherein the user's hand slips between the attachment and the device or device case to provide the user the ability to hold and use a wireless device comfortably for long periods of time without fear of dropping the device.

The Bethea Published Patent Application discloses:

"The present invention generally relates to a holding device for a phone or other electronic device. The device has an exterior housing and a generally hollow interior. The back of the exterior housing has a plurality of finger receiving finger loops which pivot from a generally parallel position with respect to the back of the device to a generally perpendicular position with respect to the back of the device. The finger loops may move independently The handle is more of an "X" member which decreases flexibility and in fact makes the cell phone protector case more difficult to grasp."

The Murphy Published Patent Application discloses an "Elastic Finger Strap and Surface Mount for Electronic Device". This is best seen in the cover picture of the Published Patent Application and also shown in FIG. 9. Referring to Section 3 and 4, the summary of the Application states:

"In one aspect, the present disclosure relates to a flexible strap that is adhered to a rigid base that is in turn adhered to the back of an electronic device allowing the user to hold the electronic device securely with one or more fingers. The strap is flexible enough to allow a user to hold the device in a variety of ways, making it safer as well as more practical and ergonomic to use. The rigid base may be bow tie-shaped, as shown in the drawings, or of a shape, design or color that can be used to distinguish or stylize the electronic device it is attached to. The strap and strap base are of a low profile (ideally less than one quarter of an inch) so as to not interfere with the usual operation or grip of the device or other methods of securing the device. The handle is designed to retain only one finger, as illustrated in the drawings."

The Hammond Published Application discloses an "Illuminated Cell Phone Case". The one piece bumper (106 in FIG. 1A) protects the cell phone from damage. This is an illuminated cell phone case The Chiu Published Patent Application discloses:

"A multifunctional strap system for portable electronic devices having a case and a strap on the back of the case. The case securely holds a protective electronic device while allowing access to all necessary features of the device. The strap securely couples a user's hand or other personal effects to the device. The strap may also be attached to a clip that removably attaches the strap to the bottom of the device. The detachable clip of the strap allows the strap system to loop around and be secured onto an object. The case may have an insert that can be used as a kick stand or a protective cover of a card held into place by the strap."

The Sakamoto Published Patent Application deals with carrying a device with a screen. The strap is designed to be carried around the wrist of the wearer rather than around the hand. The Published Patent Application discloses:

"This invention is to provide a carrying case for a portable electronic terminal device such as a tablet media player or a tablet media computer having a constitution which can be held by a hand, and thus, a carrying case according to the present invention comprises a mounting main body for mounting and fixing a portable electronic terminal device having a screen with a specific size which is an information displaying screen and a touch input screen, a handle portion rotatably held to said mounting main body; and an arm portion fixed on said handle portion and holding a hand or an arm of a user between the handle portion and itself."

The Modrell Published. Application discloses:

"A case for handheld electronic device, having a housing configured to couple to and cover at least a portion of one or more surfaces of the handheld electronic device. The case includes a detachable cover having a fixed end opposite a free end, the fixed end forming a hinge with the housing and configured to be detachably released from the housing at the hinge. The housing has a recessed cargo area sized to retain articles within the case. The cover rotates at the hinge from a stowed configuration to an open configuration with respect to the housing. In the stowed configuration, the free end of the cover is positioned adjacent the housing to enclose the cargo area. In the open configuration, the free end is rotated away from the housing to expose the cargo area."

The Potter Published Patent Application discloses a "Holding Aid for a Personal, Hand-Held, Tablet-Shaped Device". The hand held section shown in FIG. 2 contains ridges with fingers inserted through the respective ridges.

There is a significant need for an improved cell phone protector case with a secure and highly visible grasping strap.

SUMMARY OF THE INVENTION

The present invention is a handheld cell phone protector case with a secure gripping strap to enable the cell phone protector case to be securely grasped in one hand while operated with a user's other hand to operate cell phone computer applications and to enable the user to talk into and listen to a person's voice. An additional feature of the present invention includes additional transverse and arcuate openings or slots in the cell phone protector case to facilitate a retaining strap which enables the cell phone protector case to be worn around a body part including an upper arm portion or a lower arm portion so that the person is able to engage in activities such as jogging and have the cell phone retained in the cell phone protector case available to talk to callers by putting the cell phone on speaker mode while the person is engaged in a physical activity such as jogging. The cell pone protector case also retains a cell phone through a press fit within an interior chamber of the cell phone protector case.

It is an object of the present invention to provide a cell phone protector case with an adjustable secure gripping strap where the gripping strap can be opened to adjust the tightness of the gripping strap about a user's hand or other body such as an arm so that the user can securely grasp the cell phone protector case in one hand or retain the cell phone protector case on a body part such as an arm while operating the cell phone computer applications with the user's other hand or hand on the arm the cell phone protector case is retained, and to also enable the user to talk into the cell phone retained within the cell phone protector case and listen to verbal communications.

It is also an object of the present invention to provide a reflector on the strap of the cell phone protector case to enable the strap to be seen in low light conditions. The reflective material can also be applied to the back of the cell phone protector case to further increase visibility of the cell phone protector case.

It is a further object of the present invention to provide a cell phone protector case which includes a retaining strap which can be opened so that the strap can be fastened about an object selected from the group consisting of a bicycle, a backpack, luggage, a briefcase, a sports bag, a gym bag, or any other object a person will carry or ride on so that the cell phone can be utilized without the person having to hold the cell phone protector case and which further enables the cell phone protector case to be transported without having to be carried by hand in order to be used.

It is an object of the present invention to provide a cell phone protector case which securely retains the cell phone such as a smart phone therein.

It is a further object of the present invention to provide an adjustable Velcro® strap (generally referred to as a hook and loop fastener) affixed to the back of the cell phone protector case to facilitate a user gripping the cell phone protector case with the back of the user's hand between the cell phone protector case and the strap so that the strap provides added security to reduce the possibility of the cell phone case slipping out of the user's hand, or to securely retain the cell phone protector case around a portion of a user's arm.

It is an additional object of the present invention to provide a cell phone protector case which is made of dual density construction to provide protection and durability.

It is a further object of the present invention to provide a cell phone protector case which is also designed in an ergonomic shape to provide a comfortable grip or comfortable retention around an arm.

It is also an object of the present invention to provide a cell phone protector case which includes a carrying strap having a zig-zag TPU zone for increased grip. In addition, the strap is a low profile, high visibility strap with an adjustable pull tab so that the strap will stay in place when the hand griping the cell phone protector case is relaxed as well stay on an arm in spite of vigorous movement of the arm.

It is another object of the present invention to add a reflective strip to the carrying strap so that there is added visibility for the user while the user is engaged in outdoor activities with minimal daylight.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Figure 1:
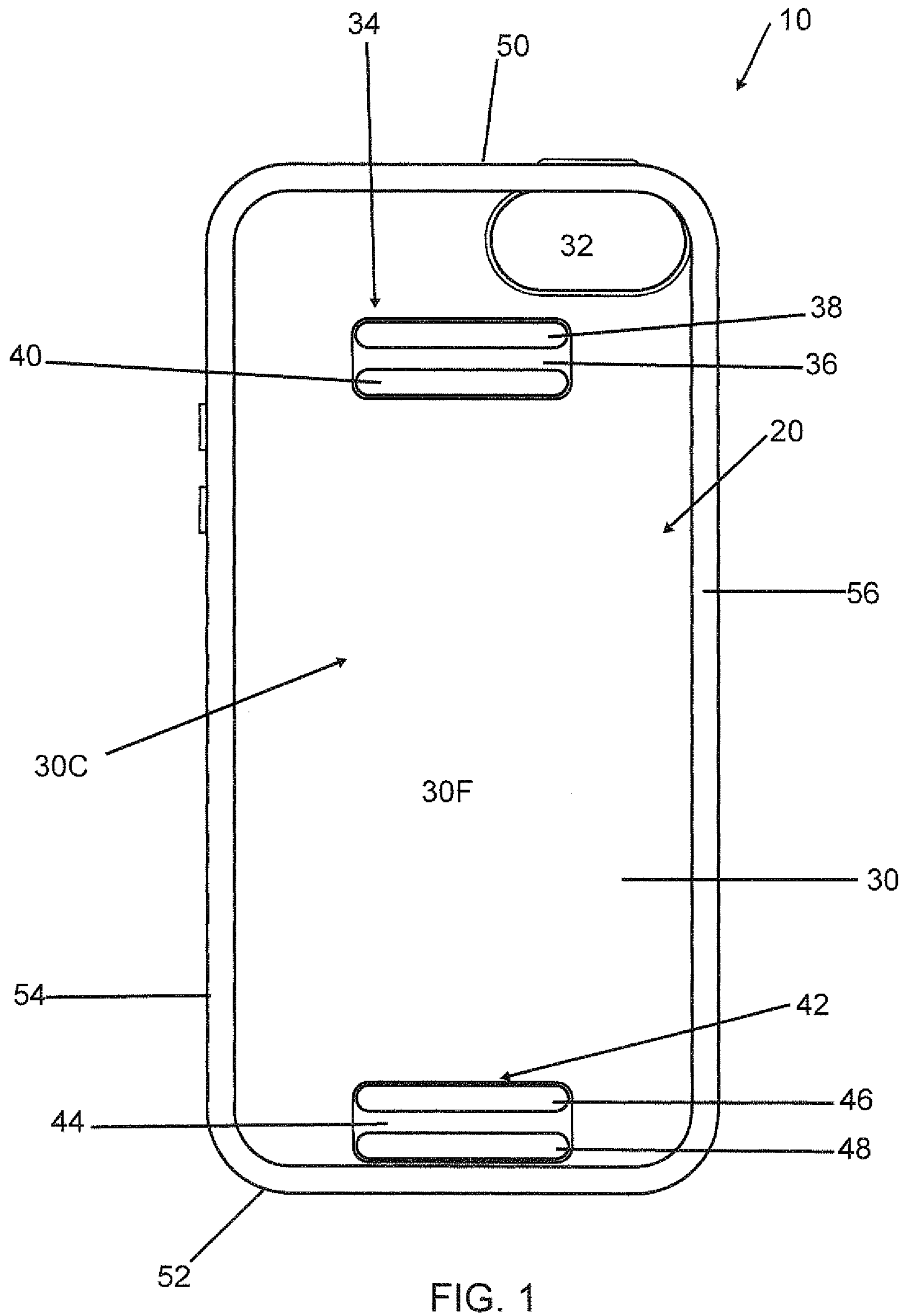
FIG. 1 is a front elevational view of the present invention handheld cell phone protector case with two pairs of oppositely disposed spaced apart horizontal slots extending through the thickness of the cell phone protector case wall without the adjustable reflective strap inserted.
Figure 2:
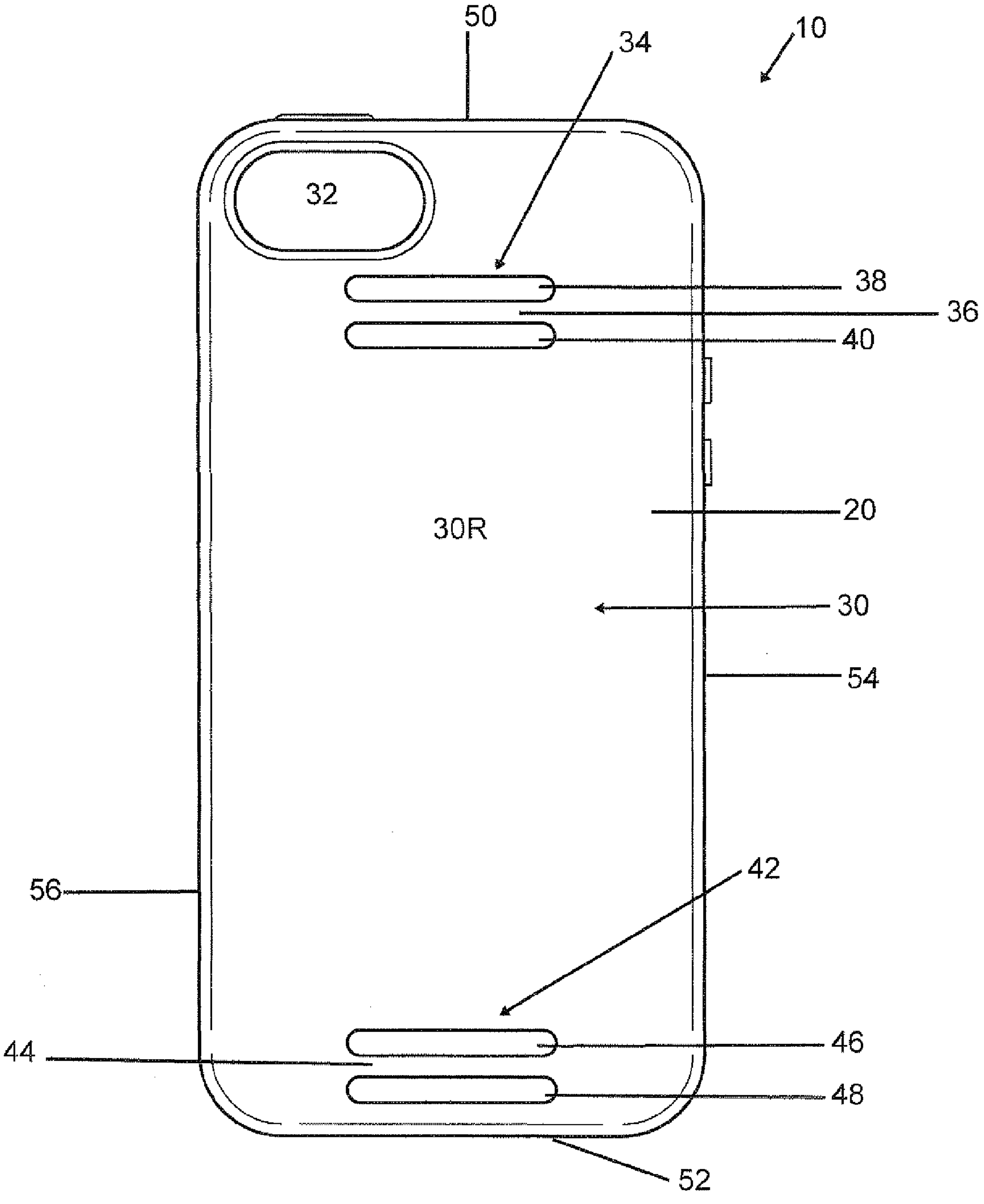
FIG. 2 is a rear elevational view of the present invention handheld cell phone protector case with two pairs of oppositely disposed spaced apart horizontal slots extending through the thickness of the call phone protector case wall without the adjustable reflective strap inserted.

Referring to FIGS. 1 and 2, there are illustrated front and rear views of the present invention cell phone protector case 10 with a main body 20 having a rear wall 30 with a front surface 30F and a rear surface 30R which may be made of TPU (Thermo Polyurethane) with an opening 32 for a camera and a first or upper horizontal strap retaining opening 34 which is divided by a dividing bar 36 into a first upper slot 38 and a first lower slot 40. A parallel second or lower horizontal strap retaining opening 42 is divided by a dividing bar 44 into a second upper slot 46 and a second lower slot 48. The slots 36, 38, 46 and 48 are parallel to the upper wall 50 and lower wall 52 An upper wall 50, a parallel lower wall 52, a first or left sidewall 54 and a parallel or second right sidewall 56 along with the rear wall 30 form an interior chamber 60 (see FIG. 3) into which a cell phone is press fit retained. The upper wall 50, lower wall 52, first sidewall 54 and second sidewall 56 can have various openings and buttons to accommodate a specific model of cell phone being retained.

Figure 3:
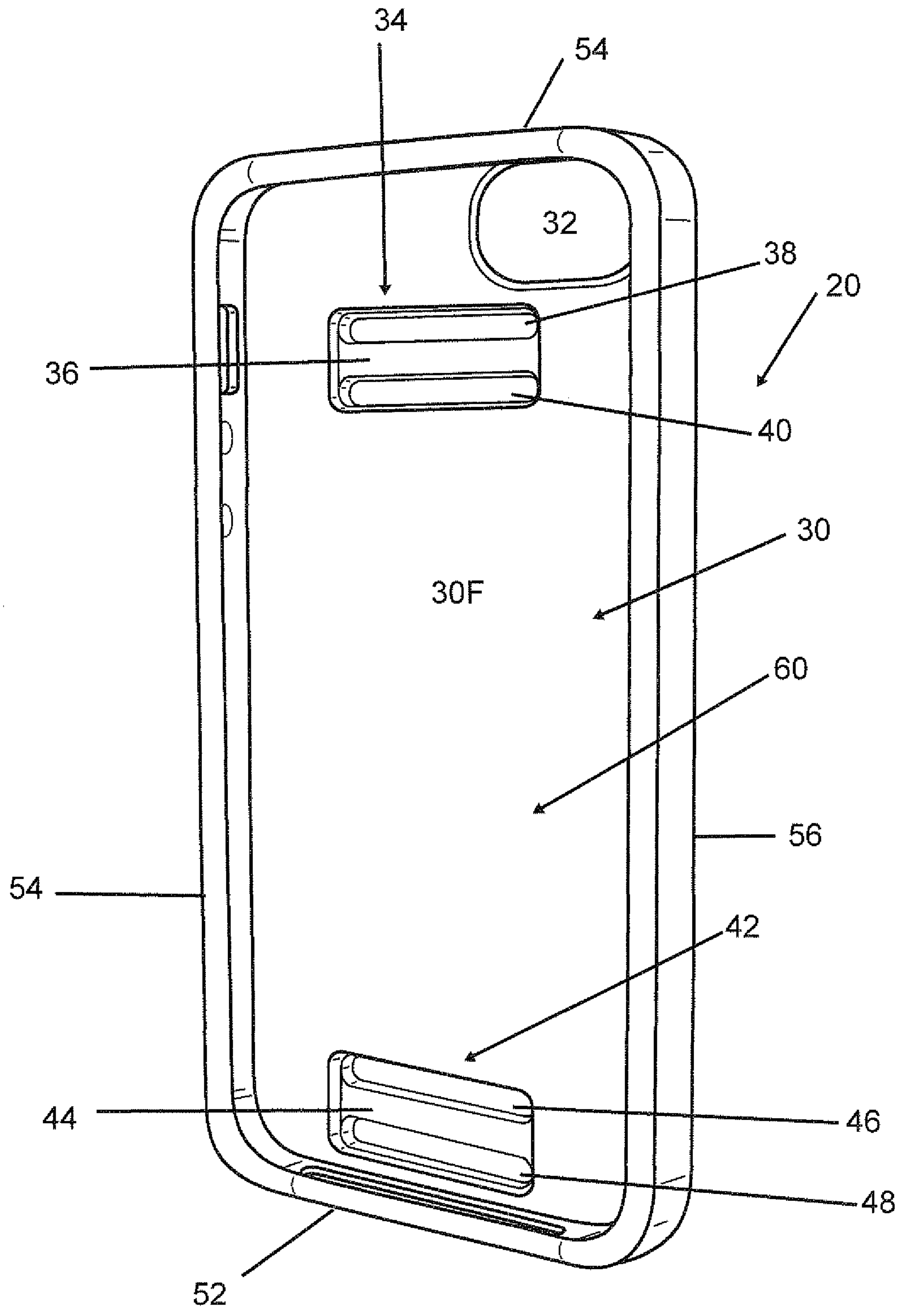
FIG. 3 is a front perspective view of the present invention handheld cell phone protector case without the adjustable reflective strap inserted through the two pairs of spaced apart oppositely disposed horizontal slots.
Figure 4:
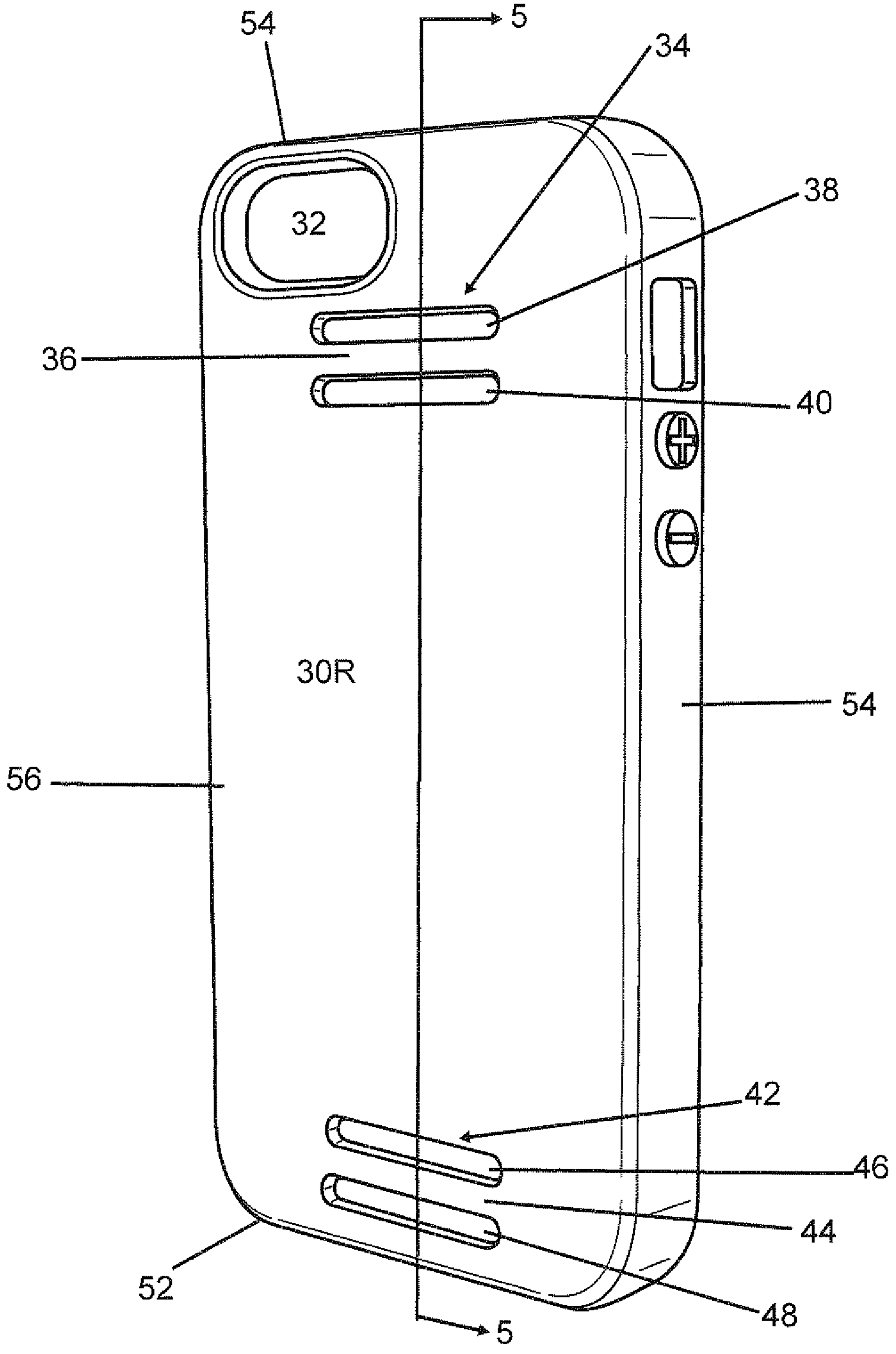
FIG. 4 is a rear perspective view of the present invention handheld cell phone case without the adjustable reflective strap inserted through the two pairs of spaced apart oppositely disposed horizontal slots.
Figure 5:
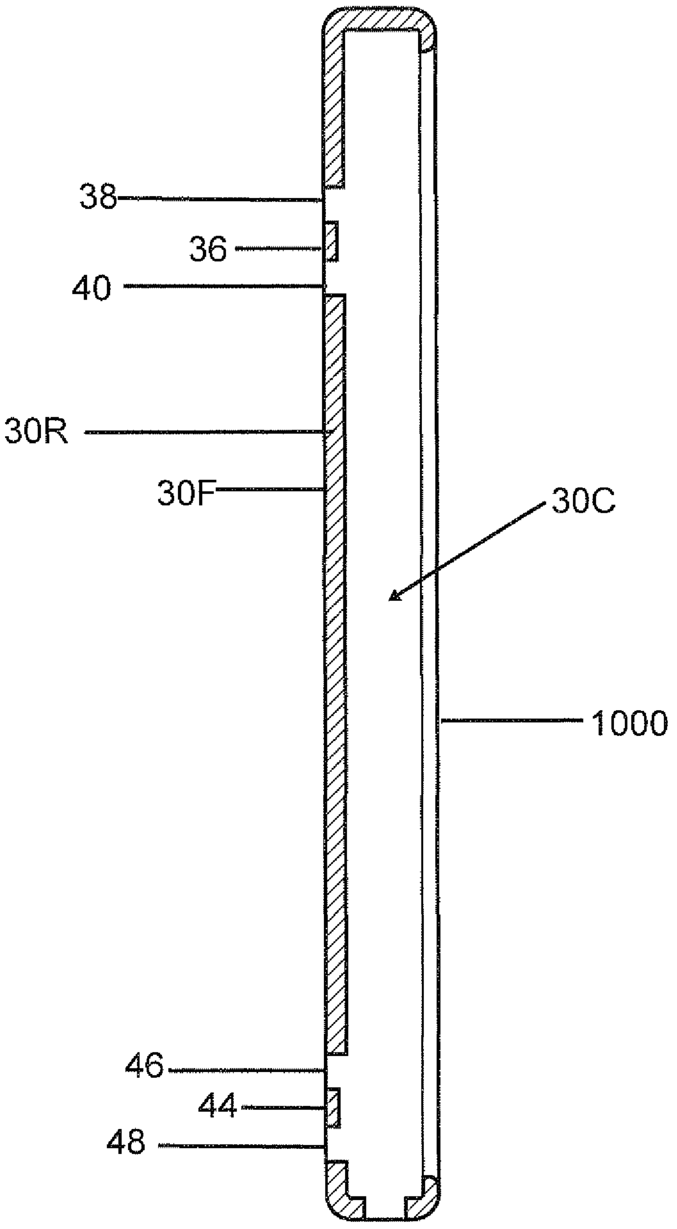
FIG. 5 is a cross-sectional view taken along line 5-5 of FIG. 4.
Figure 6:
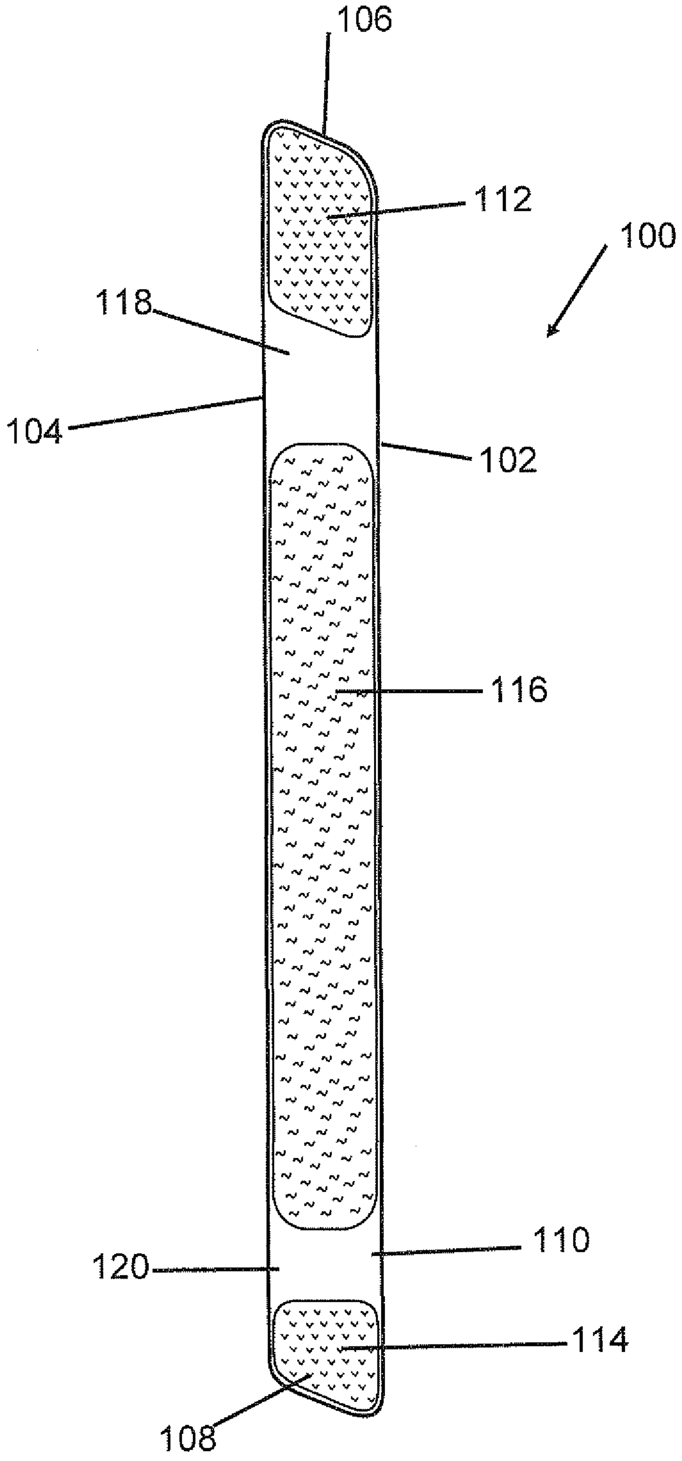
FIG. 6 is an interior view of the low profile adjustable strap of the present invention with hook and loop fasteners fused to the strap.
Figure 7:
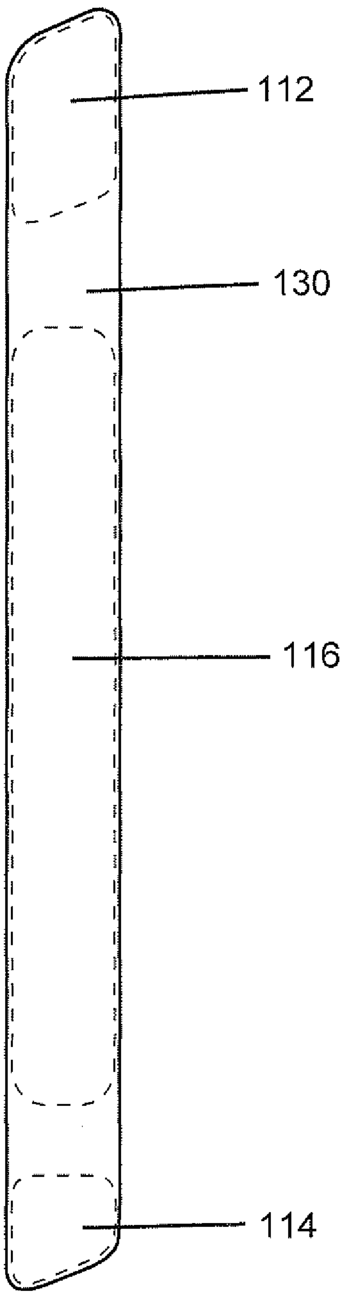
FIG. 7 is an exterior view of the low profile adjustable strap of the present invention with hook and loop fasteners shown in dotted lines fused to the strap.
Figure 8:
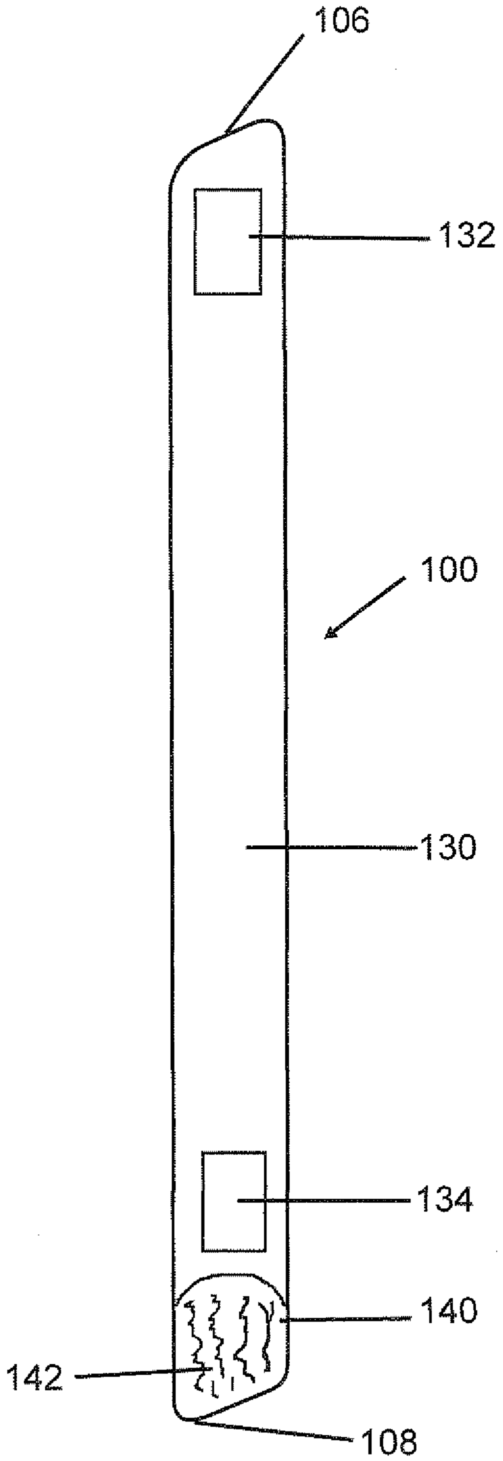
FIG. 8 is an exterior view of the low profile adjustable strap of the present invention.
Figure 9:
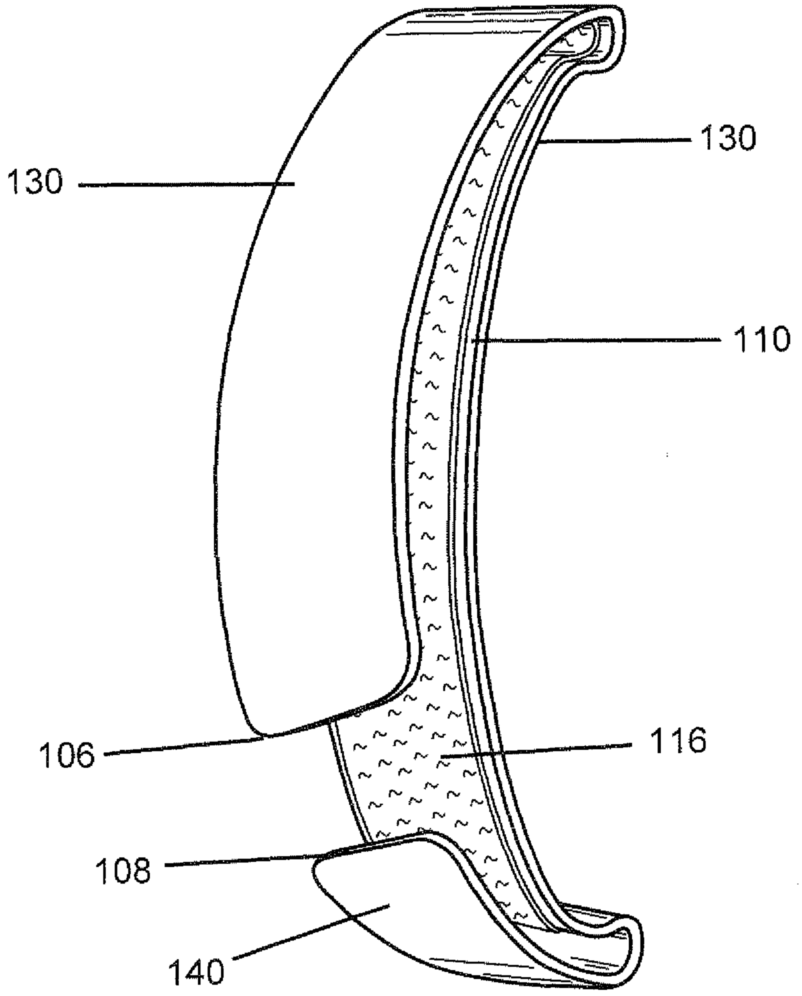
FIG. 9 is a rear perspective view of the low profile adjustable strap of the present invention with the hook fasteners not affixed to the loop fasteners.
Figure 10:
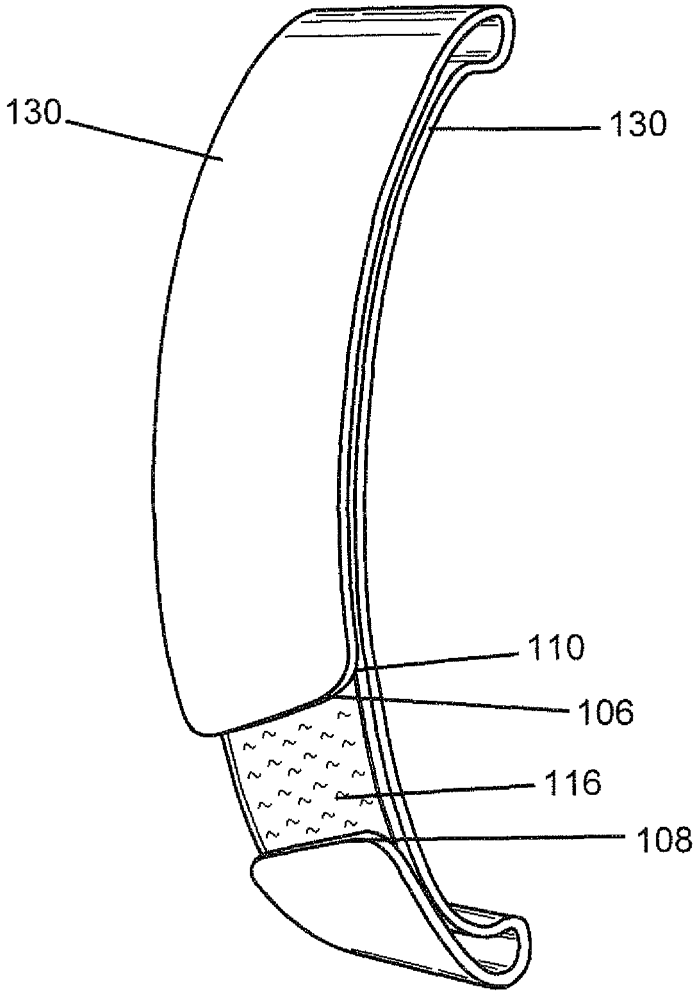
FIG. 10 is a rear perspective view of the low profile adjustable strap of the present invention with the hook fasteners affixed to the loop fasteners.
Figure 11:
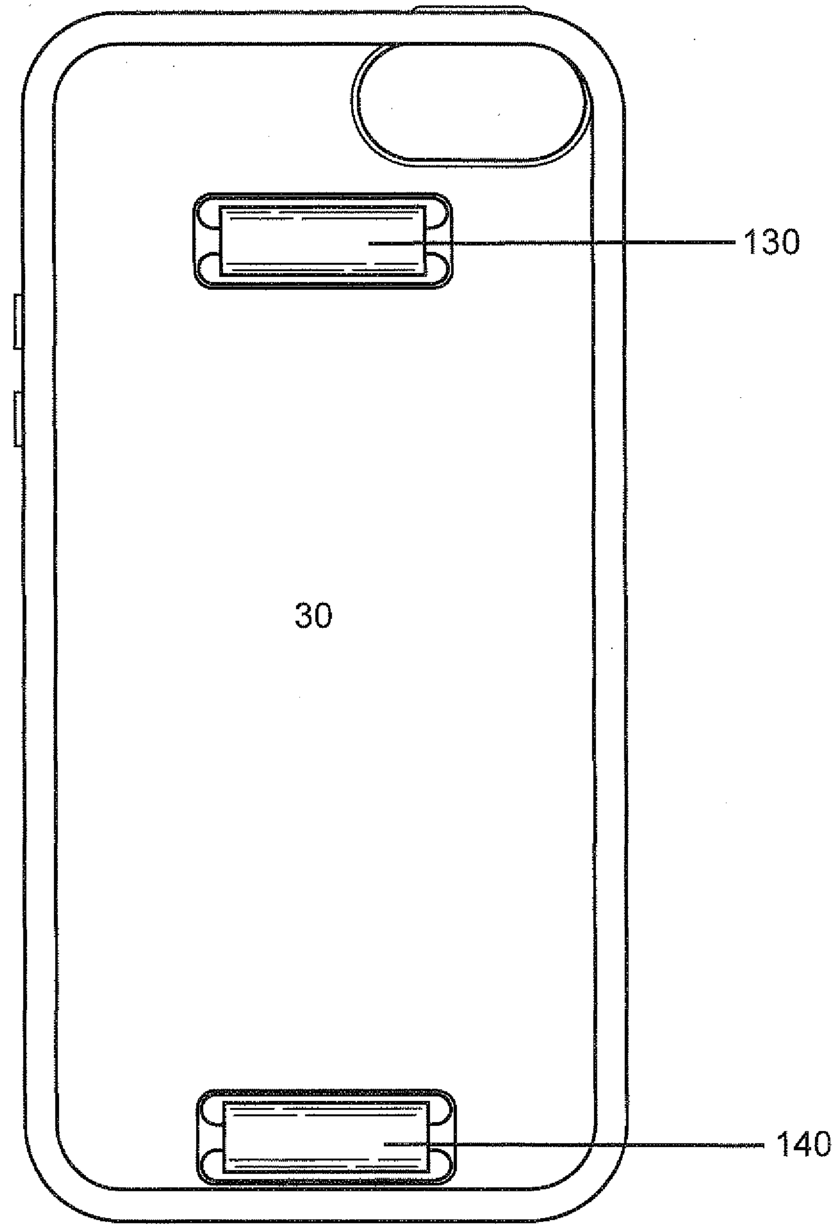
FIG. 11 is a front elevational view of the present invention handheld cell phone protector case with the low profile adjustable strap of the present invention inserted in a pair of spaced apart oppositely disposed parallel slots which extend through the thickness of the cell phone protector case wall.
Figure 12:
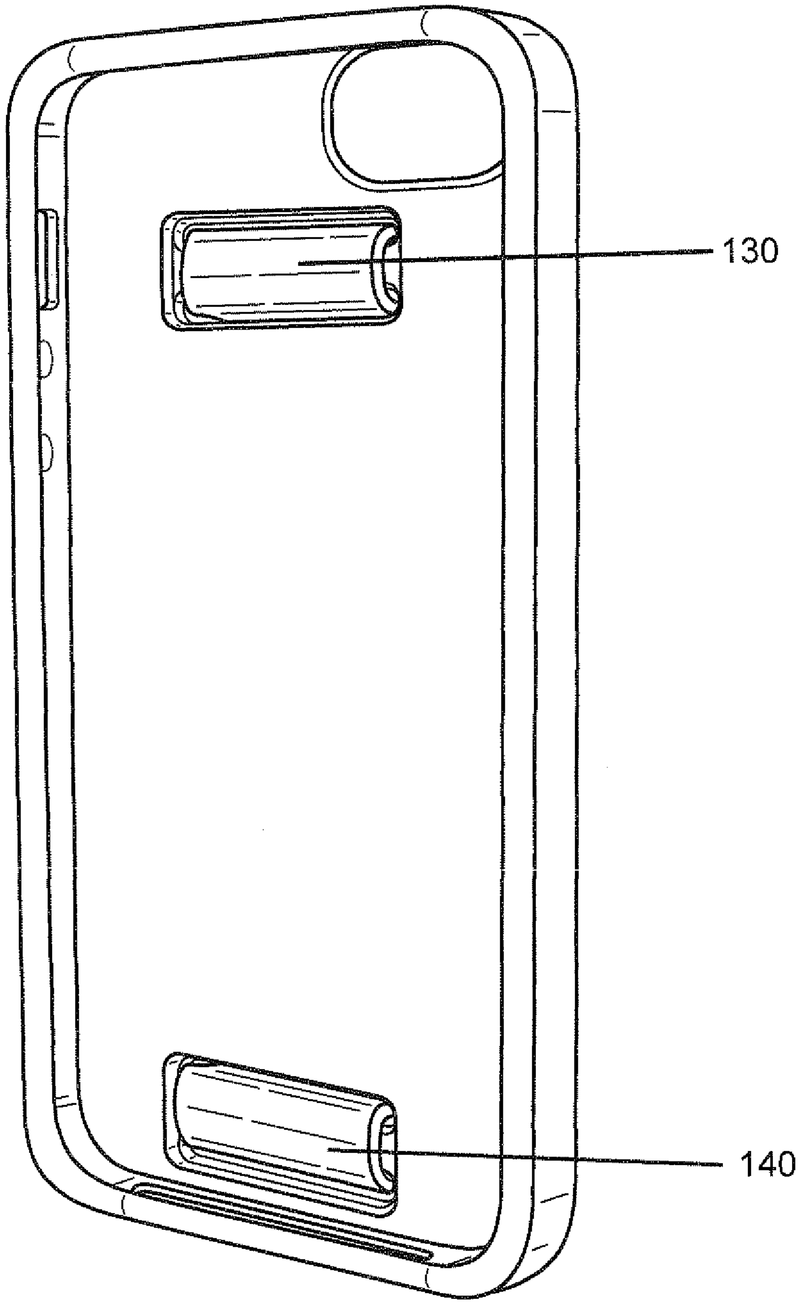
FIG. 12 is a front perspective view of the present invention handheld cell phone protector case with the low profile adjustable strap of the present invention inserted in a pair of spaced apart oppositely disposed parallel slots which extend through the thickness of the cell phone protector case wall.

Referring to FIGS. 3, 4 and 5, there are respectively illustrated front and rear perspective views of the present invention cell phone protector case 10 with a main body 20 having a rear surface 30R of the rear wall 30 with the upper strap retaining opening 34 extending through the rear surface 30R to the front surface 30F and including the first or upper strap retaining opening 34 divided by the dividing bar 36 into first upper slot 38 and first lower slot 40 extending from the front surface 30F through the rear wall 30 to the rear surface 30R. Similarly, parallel second or lower strap retaining opening 42 with dividing wall 44 and second upper slot 46 and second lower slot 48 also extend from the front surface 30F through the rear wall 30 and to the rear surface 30R.

The lower strap retaining opening is adjacent lower wall 52 while upper strap retaining opening 34 is spaced apart from upper wall 50. A cell phone 1000 is retained in the front chamber 60 surrounded by walls 50, 52, 54 and 56.

Referring to FIGS. 6 through 10, there are illustrated views of a key innovation of the present invention which is the elongated low profile adjustable strap 100. The strap 100 is elongated having a first sidewall 102, a second sidewall 104, a first end 106, a second end 108, an interior surface 110 and an exterior surface 130. The interior surface 110 which includes a pair of spaced apart hook fasteners which are first hook fastener 112 adjacent first end 106 and second hook fastener 114 adjacent second end 108. The interior surface further includes an elongated loop fastener 116 extending for over half the length of the strap 100 separated from first hook fastener 112 by a first space 118 and separated from the second hook fastener 112 by a second space 120. Both the hook fasteners 112 and 114 and loop fastener 116 are fused to the interior surface 110 of strap 100. The exterior surface 130 includes a first reflective screen print 132 adjacent first end 106, a reflective pull tab 140 affixed adjacent second end 108 and a second reflective screen print 134 adjacent the pull tab 140. The pull tab 140 has see-through holes 142 to provide texture to the tab 140.

Referring to FIGS. 9 through 14, the strap 100 has a second end 108 fed into the top retaining opening by its interior surface 110 through first lower slot 40 and rotated so that it is fed back through first upper slot 38 around dividing bar 36 and its upper surface 130 extends out behind the cell phone protector case rear surface 30R so that the first hook fasteners 112 are affixed to a portion of the loop fasteners 116. Second end 106 of strap 100 is fed into lower or bottom retaining opening 42 by its interior surface 110 pushed through second upper slot 46 and rotated so the it is fed back around dividing wall 44 through first lower slot 48 and extends out behind the cell phone protector case 30R so that the first hook fasteners are affixed to a portion of the loop fasteners. The reflective pull tab 140 and reflective screen prints 132 and 134 are clearly visible from the exterior surface 130 of strap 100.

Figure 15:
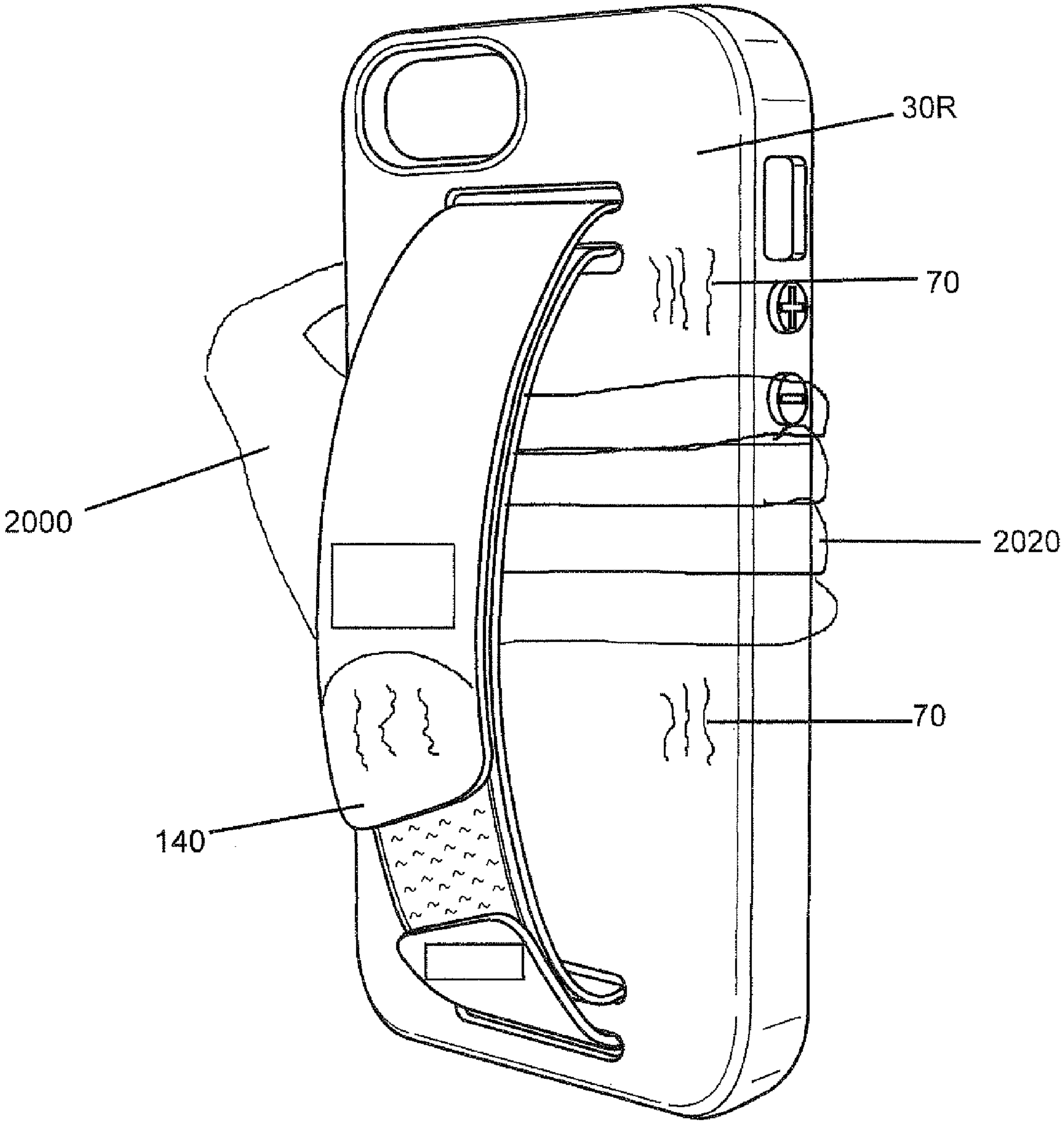
FIG. 15 is a perspective view of a present invention handheld cell phone protector case with the adjustable strap inserted through the two pairs of horizontal slots as illustrated in FIG. 13 and FIG. 14, illustrating the cell phone protector case carried by hand with a user's hand between the strap and the cell phone protector case, with a tight grip due to tight adjustment of a strap about the user's hand.
Figure 22:
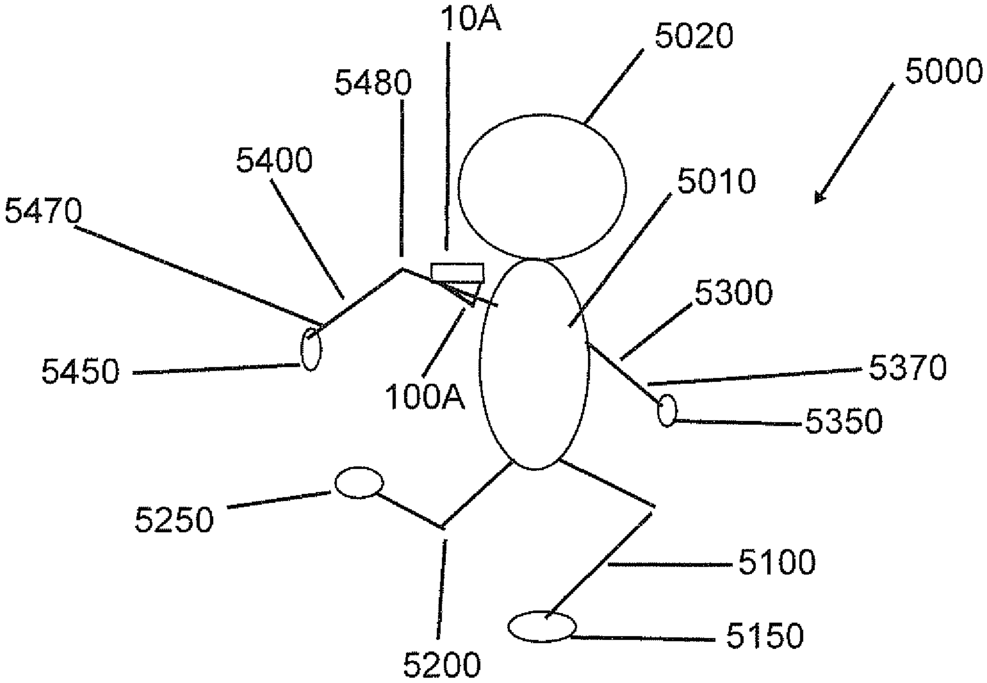
FIG. 22 is a perspective view of the present invention cell phone protector case illustrated in FIG. 19 illustrating the cell phone protector case retained on an upper arm with the upper arm inserted between the low profile adjustable strap and the cell phone protector case.

Referring to FIG. 15, in use a person places his/her hand 2000 between the rear surface 30R of the cell phone protector case and the interior surface 110 of the strap 100 facing the rear surface 30R and adjusts the tightness of the strap 100 by lifting up the pull tab 140 and adjusts where the second hook fastener 114 is positioned on the loop fastener 116 relative to the first hook fastener 112. Therefore, the user places his/her fingers 2020 around the sidewalls 54 and 56 and the cell phone protector case 10 with the user's hand between the strap 100 and the back 30R of the cell phone protector case so the cell phone protector case 10 is securely grasped in one hand enabling a person to operate the cell phone with the user's other hand. It is also possible to retain the cell phone protector case on another body part such as an upper arm, as illustrated in FIG. 22 with the user's arm between the strap 100 and a portion of the user's arm. The cell phone protector case is securely retained around the user's arm to enable the user to engage in physical activity such as jogging while speaking on a cell phone retained in the cell phone protector case.

The cell phone protector case 10 and its rear wall 30R, upper wall 50, lower wall 52, first sidewall 54 and second sidewall 56 are made of dual density TPU construction to provide protection and durability. The ergonomic shape of the cell phone 10 and strap 100 facilitate a comfortable grip.

The rear surface 30R can have a zig-zag pattern 70 for increased grip. In addition, the low profile high visibility strap 100 with adjustable pull tab 140 assures that the strap 100 will stay in place when the hand gripping the cell phone protector case 10 is relaxed. The reflective strips 132 and 134 and reflective pull tab 140 have phosphorescent material such as paint applied so that the cell phone protector case 10 is provided with added visibility in low light.

For increased strength and flexibility, the strap 100 is preferably made of double layered Lycra or similar material. The molded pull tab 140 can be made of silicone.

Figure 13:
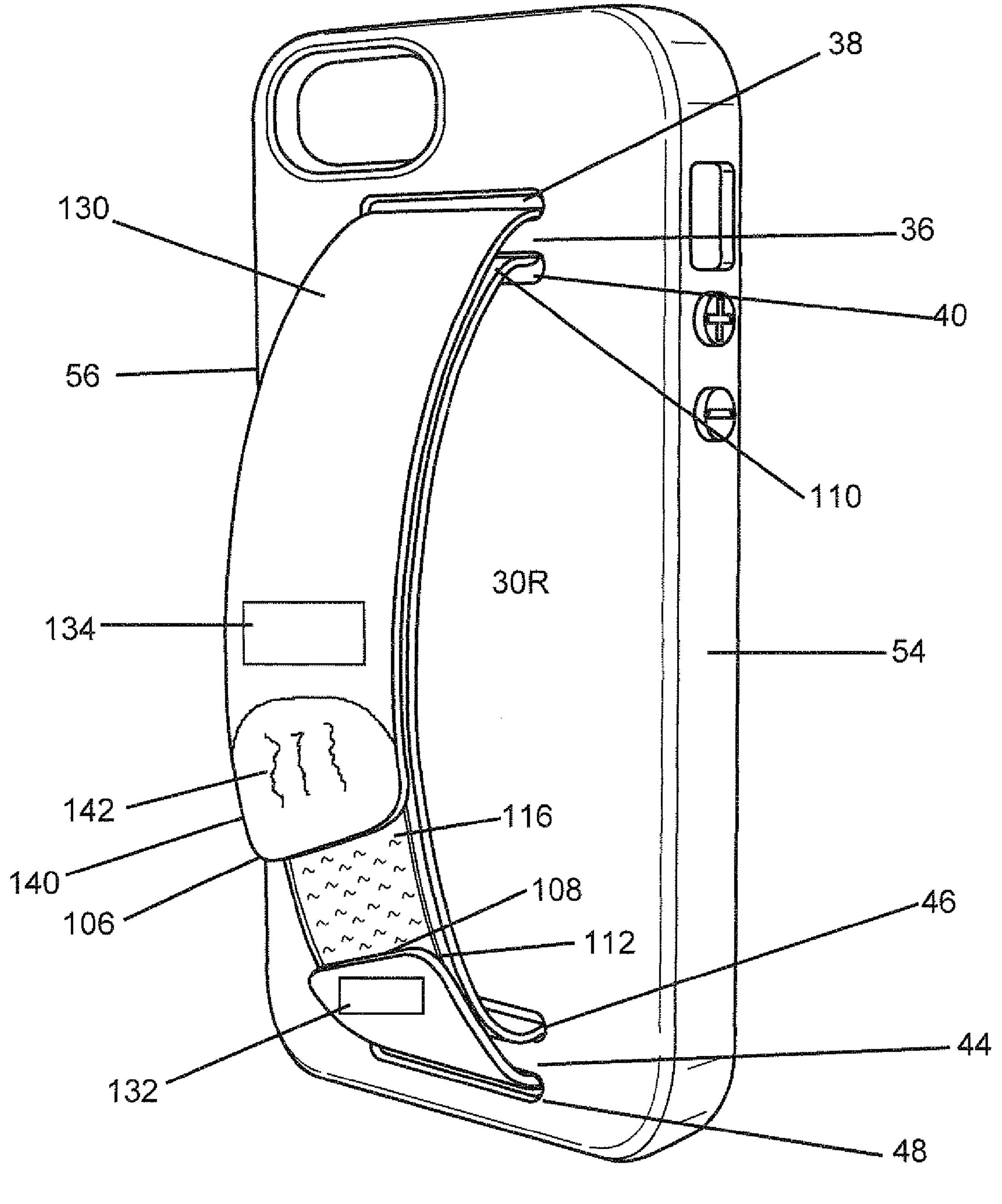
FIG. 13 is a rear perspective view of the present invention handheld cell phone protector case with the low profile adjustable strap of the present invention inserted into and through the two horizontal pairs of spaced apart horizontal slots and in the operative condition to enable a hand to be inserted between the strap and the cell phone protector case.
Figure 14:
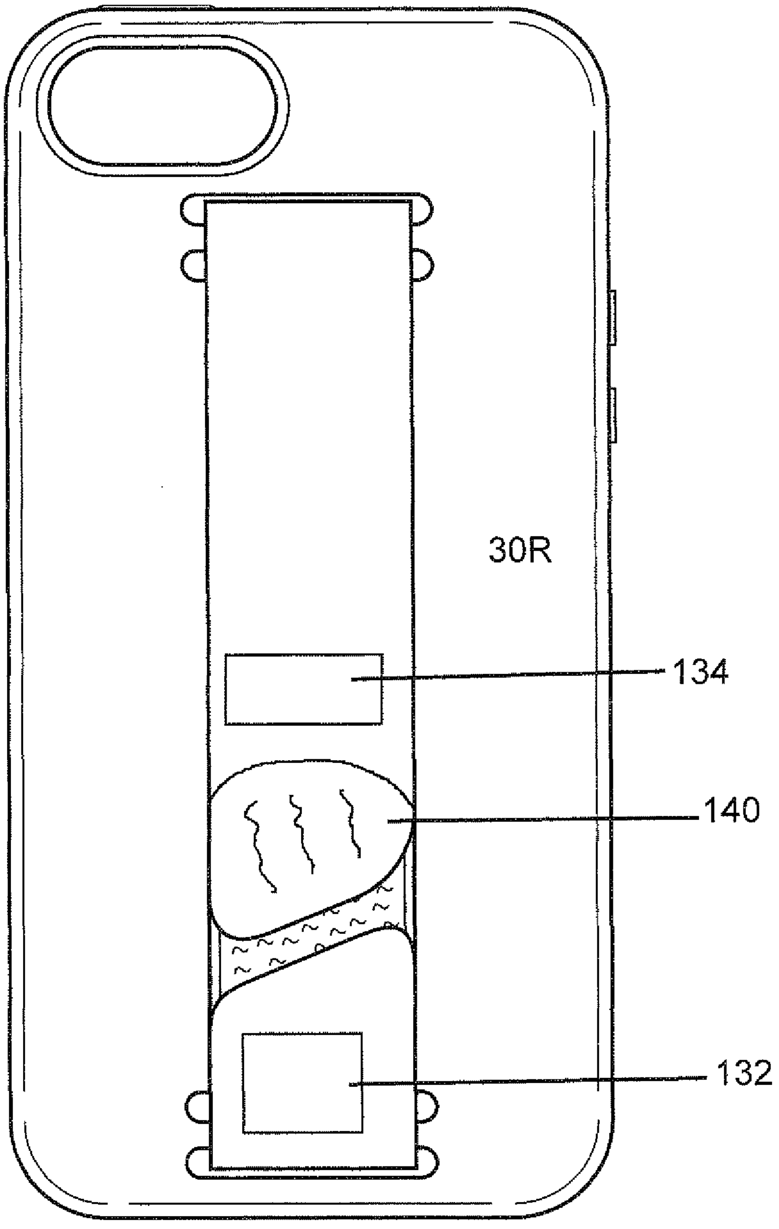
FIG. 14 is a rear elevational view of the present invention handheld cell phone protector case with the low profile adjustable strap of the present invention inserted into and through the two horizontal pairs of spaced apart horizontal slots and in the operative condition to enable a hand to be inserted between the strap and the cells phone protector case.

As illustrated in FIG. 13, the adjustable strap can be tightened and adjusted at the location of second hook fastener 114 against the loop fastener 116 to accomplish an object of the present invention to provide a cell phone protector case with an adjustable secure gripping strap where the gripping strap can be opened to adjust the tightness of the gripping strap about a user's hand so that the user can securely grasp the cell phone in one hand while operating the cell phone computer applications with the user's other hand and to also enable the user to talk into and listen to the person's voice on the cell phone.

Figure 16:
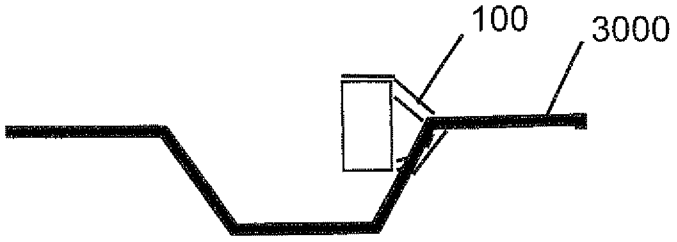
FIG. 16 is a perspective view of the present invention handheld cell phone protector case carried on a bicycle handle.
Figure 17:
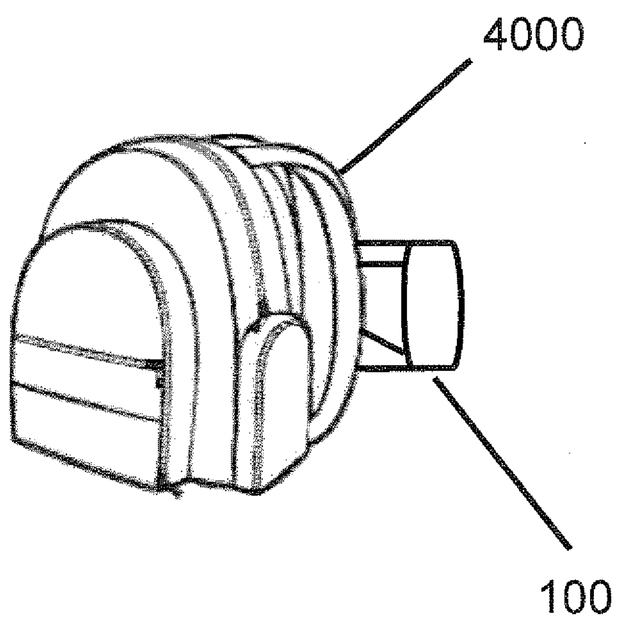
FIG. 17 is a perspective view of the present invention cell phone protector case carried on a backpack.

As illustrated in FIG. 16, the strap 100 can be fastened around a bicycle handlebar 3000. As illustrated in FIG. 17, the strap 100 can be fastened around a portion of the backpack 4000 illustrating an object of the present invention to provide a cell phone protector case which includes a retaining strap which can be opened so that the strap can be fastened about an object selected from the group consisting of a bicycle, a backpack, luggage, a briefcase, a sports bag, a gym bag, or any other object a person will carry or ride on so that the cell phone can be utilized without the person having to hold the cell phone protector case and further enables the cell phone protector case to be transported without having to be carried by hand in order to be used.

It will also be appreciated that it is within the spirit and scope of the present invention to interchange the hook fasteners 112 and 114 to be loop fasteners and the loop fastener 116 to be a hook fastener.

Figure 18:
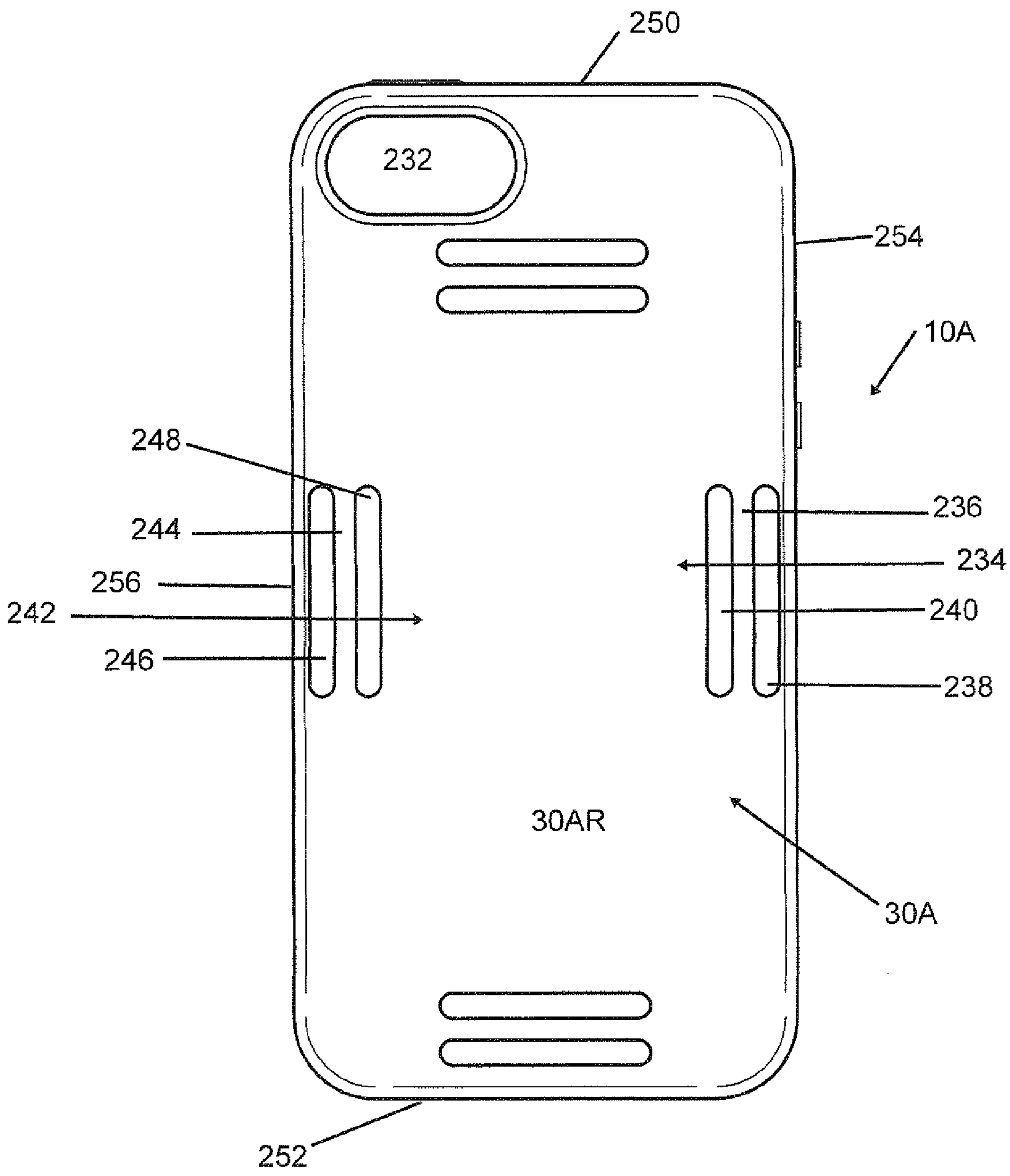
FIG. 18 is a rear elevational view of the present invention cell phone protector case which includes two additional pairs of spaced apart vertical slots extending through the thickness of the cell phone protector case wall without the adjustable reflective strap inserted.
Figure 19:
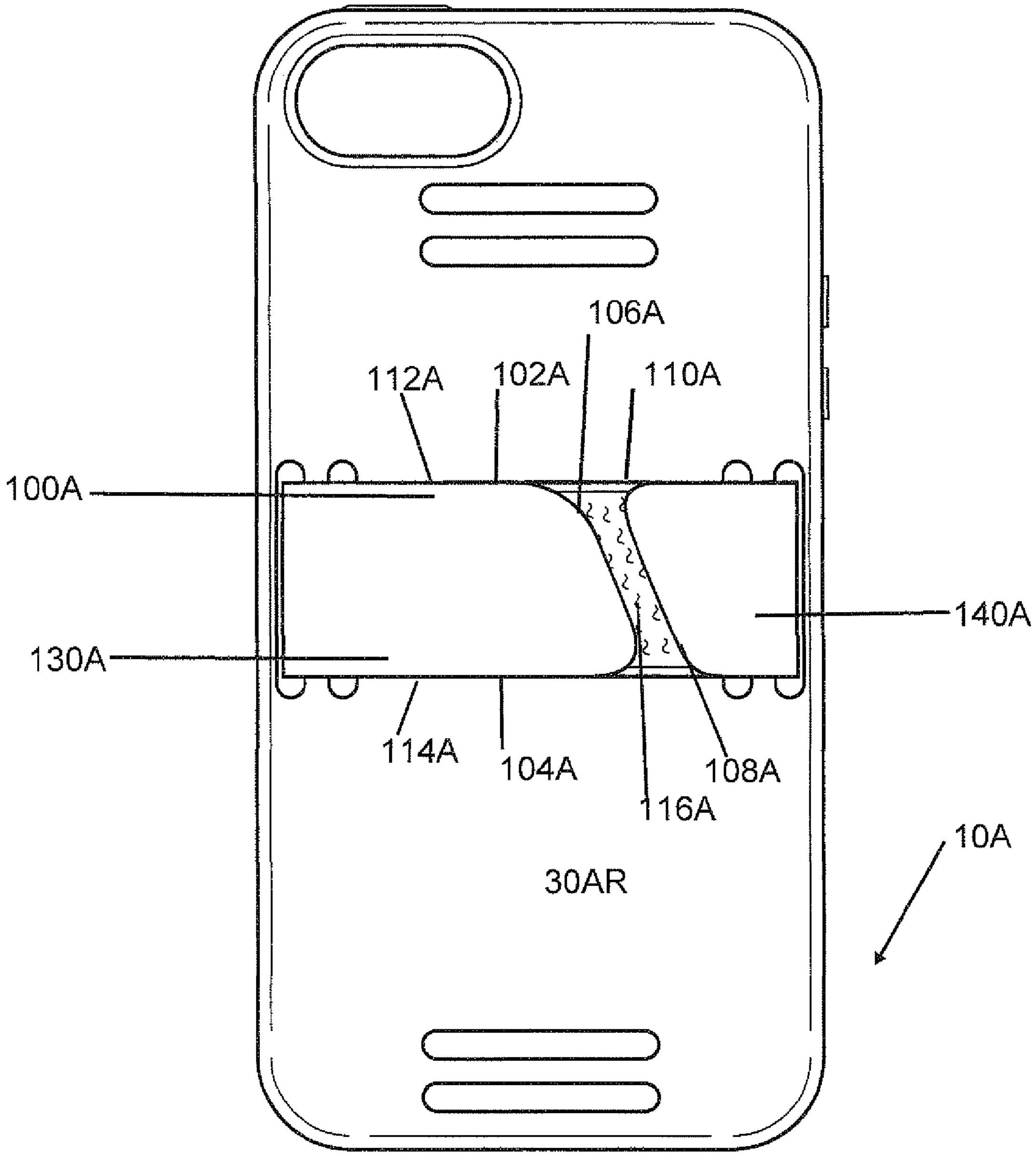
FIG. 19 is a rear elevation view of the present invention cell phone protector case which includes two additional pairs of spaced apart vertical slots extending through the thickness of the cell phone protector case wall with the low profile adjustable strap of the present invention inserted into and through two pairs of spaced apart vertical slots and in the operative condition enabling a portion of an upper aim or lower arm to be inserted between the strap and the cell phone protector case.

Referring to FIGS. 18 and 19, there is illustrated a variation of the present invention cell phone protector case 10A having a rear surface 30AR with a top wall 250, a bottom wall 252, a first sidewall 254 and a second sidewall 256. A comparison with the first embodiment of the cell phone protector case 10A shows that it is substantially identical. The first upper slot (comparable to 36), second upper slot (comparable to 38), first lower slot (comparable to 46) and second lower slot (comparable to 48) are illustrated but are optional in this embodiment and therefore not numbered. The modification is to have the slots oriented so that the slots adjacent a respective sidewall 254 and 256 run parallel to the sidewalls 254 and 256 and not parallel to the upper wall 250 and lower wall 252.

The first right transverse strap retaining opening 234 extends through the rear wall 30A from the rear surface 30AR through the given thickness of the rear wall 30A to its front surface including the first right transverse retaining strap opening 234 divided by the dividing wall 236 into first right transverse slot 238 and second right transverse slot 240 extending from the rear surface 30AR through the thickness of wall 30A to its front surface. Similarly, parallel first left transverse strap retaining opening 242 extends through the rear wall 30A from the rear surface 30AR through the given thickness of the rear wall 30A to its front surface including first left transverse retaining opening 242 divided by the dividing wall 244 into first left transverse slot 246 and second left transverse slot 248 extending from the rear surface 30R through the thickness of the wall 30A to its front surface.

The elongated low profile adjustable strap 100A has a first sidewall 102A, a second sidewall 104A, a first end 106A, a second end 108A, an interior surface 110A and an exterior surface 130A. The interior surface 110 includes a pair of spaced apart hook fasteners which are first hook fastener 112A adjacent first end 106A and second hook fastener 114A adjacent second end 108A. The interior surface 110A includes an elongated loop fastener 116A which is of sufficient length to be contacted by both hook fasteners 112A and 114A. As described in the first embodiment of the low profile adjustable strap 100, the low profile adjustable strap 100A is fed through the slots 238, 240, 246 and 248 in the same manner so that the low profile adjustable strap 100A appears as illustrated in FIG. 19 with the strap tightness adjustable by the mating hook and loop fasteners adjusted with a strap portion 130A or 140A removed and tightened. As illustrated in FIG. 22, the elongated low profile adjustable strap 100A is worn on a body part such as an arm 5400 with the body part between the interior surface 110A of the elongated low profile adjustable strap 100A and the body part such as an upper arm 5480 (See FIG. 22). Although not illustrated, other features of the elongated low profile adjustable strap 100 may also be included in the elongated low profile adjustable strap 100A.

Figure 20:
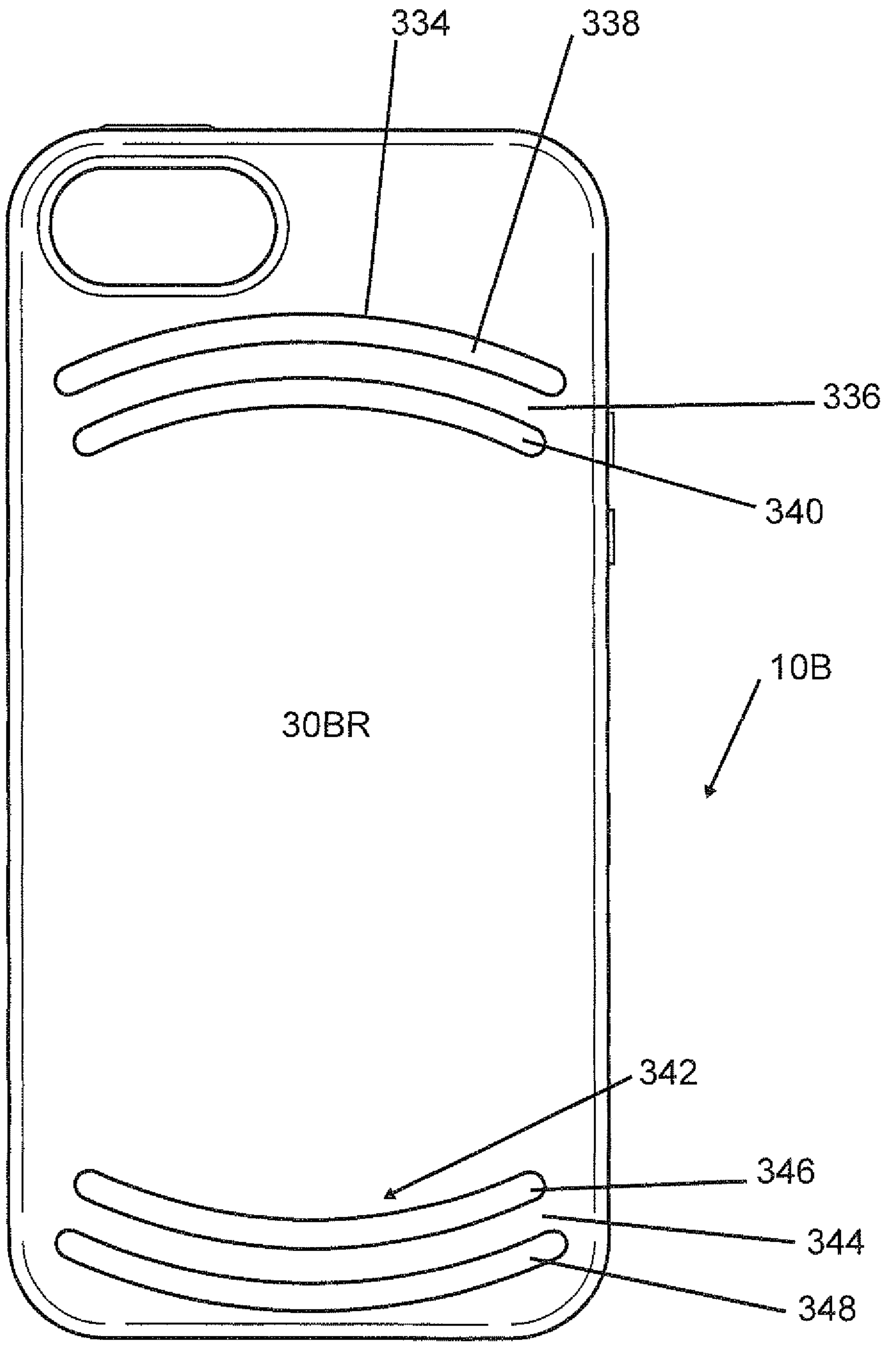
FIG. 20 is a rear elevational view of the present invention cell phone protector case with a pair of spaced apart arcuate slots extending through the thickness of the cell phone protector case wall without the low profile adjustable strap inserted through the horizontal slots.
Figure 21:
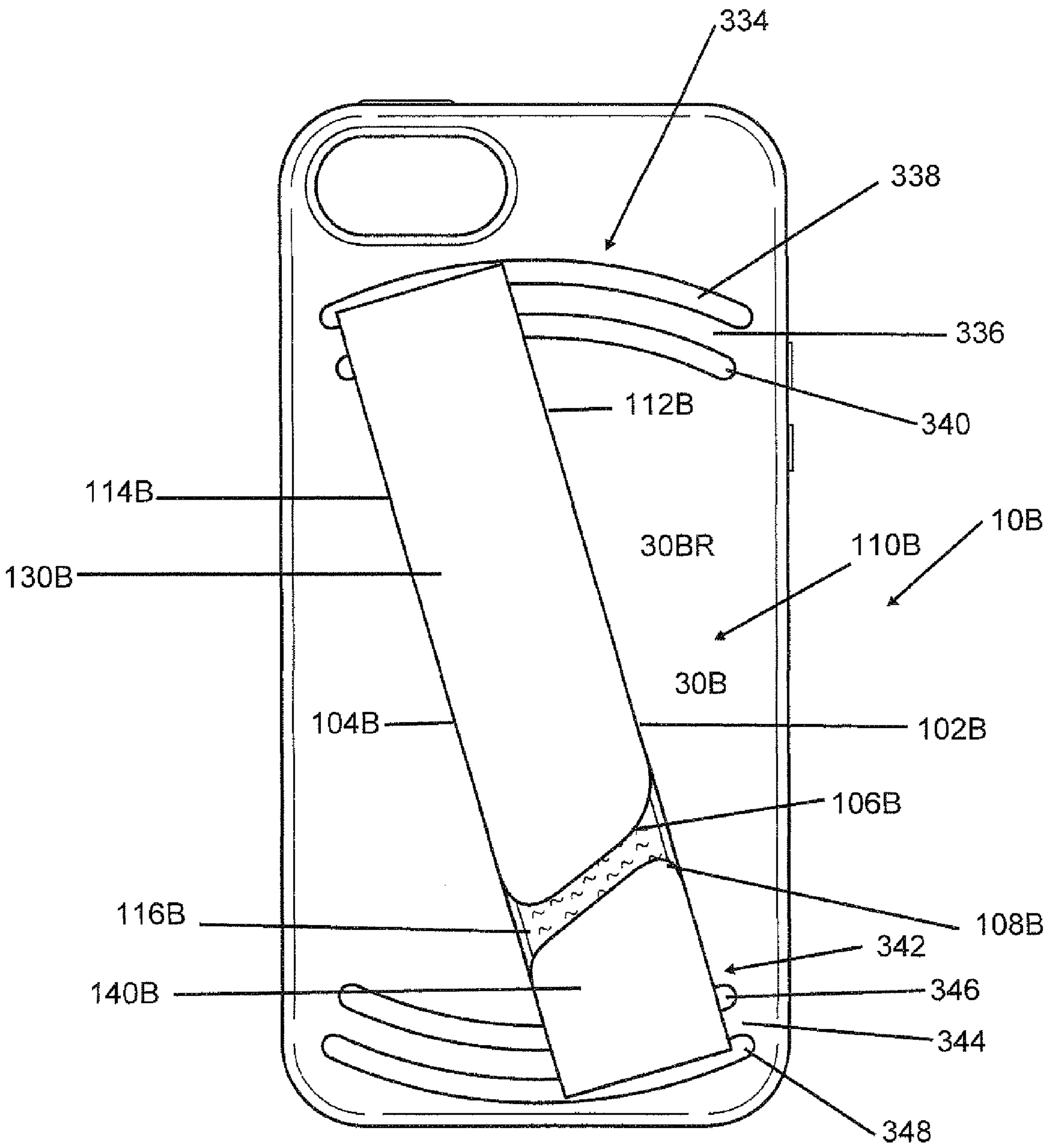
FIG. 21 is a rear elevational; view of the present invention cell phone protector case with a pair of spaced apart arcuate slots extending through the thickness of the cell phone protector case wall with the low profile adjustable strap inserted through the arcuate slots to enable the cell phone protector case to be grasped by a hand or an arm respectively inserted between the low profile adjustable strap and the cell phone protector case.

It will be appreciated that numerous other variations embodying the concept of having a low profile adjustable strap affixed to the cell phone protector case so a body part selected from the group consisting of an upper right arm, a lower right arm, an upper left arm, a lower left arm, a right leg, a left leg, a right hand and a left hand. The selected body part is retained between the low profile adjustable strap and the body part so that the cell phone protector case is securely held by hand or retained on a body part by adjusting the tightness of the elongated low profile adjustable strap so that the user can talk on the cell phone or in the case of a hand grip, also dial or text message while engaged in other activities. One additional example is illustrated in FIGS. 20 and 21. In this case the spaced apart slots are arcuate and adjust the top surface 250 and bottom surface 252. First upper arcuate retaining opening 334 extends through rear wall 30B from the rear surface 30BR through the given thickness of the rear wall 30B to its front surface including the first upper arcuate transverse retaining strap opening 334 divided by the diving wall 336 into first upper arcuate slot 338 and second upper arcuate slot 340 extending from the rear surface 30BR through the given thickness of the rear wall 30B to its to its front surface. Similarly, parallel first lower arcuate strap retaining opening 342 extends through rear wall 30B from the rear surface 30BR through the given thickness of the rear wall 30B to its front surface including first lower arcuate retaining strap opening 342 divided by the dividing wall 344 into first lower arcuate slot 326 and second lower arcuate slot 348 extending from the rear surface 30BR through the thickness of the wall 30B to its front surface.

The elongated low profile adjustable strap 100B has a first sidewall 102B, a second sidewall 104B, a first end 106B, a second end 108B, and interior surface 110B and an exterior surface 130B. The interior surface 100B includes a pair of spaced apart hook fasteners which are first hook fastener 112B adjacent first end 106B and second hook fastener 114B adjacent second end 108B. The interior surface 110B includes an elongated loop fastener 116B which is of sufficient length to be connected by both hook fasteners 112B and 114B. As described in the first embodiment of the low profile adjustable strap 100, the low profile adjustable strap 100B is fed through the arcuate slots 338, 340, 346 and 348 in the same manner so that the low profile adjustable strap 100B appears as illustrated in FIG. 21 with the trap tightness adjustable by the mating hook and loop fasteners adjusted with a strap portion 130B or 140B removable and tightened. As illustrated in FIG. 22, the elongated low profile adjustable strap (which can 100B or even 100) is worn on a body part such as en arm 5400 with the body part between the interior surface 110B of the elongated low profile adjustable strap 100B and the body part such as an upper arm 5480 (See FIG. 22). Although not mentioned, other features of the elongated low profile adjustable strap 100 may also be included in the elongated low profile adjustable strap 100B.

Referring to FIG. 22, there is illustrated a person or user 5000 having a left arm 5300 with the lower left arm 5370 and left hand 5350 illustrated. Also illustrated is a right arm 5400, an upper right arm 5480, a lower right arm 5470 and right hand 5450. Torso 5010 and head 5020 are also illustrated. Left leg 5100 and left foot 5150 and right leg 5200 and right foot 5250 are also illustrated. The person 5000 is jogging. The present invention cell phone protector case embodiment 10A is shown strapped around the right upper arm 5480 with the elongated low profile adjustable strap 100AS between the upper arm 5480 and the rear surface 30AR of the cell phone protector case 10A. It will be appreciated that any of the embodiments discussed above can be used in the same manner.

One definition of the present invention is a cell phone protector case to be used in conjunction with a cell phone retained in the cell phone protector case and in conjunction with a user's hand having a front palm, a rear surface and fingers, comprising: (a) a main body having a rear wall having a given thickness from a front surface of the rear wall to a rear surface of the rear wall, including a first retaining strap opening divided by a dividing wall into a first upper slot and a first lower slot, with each respective first upper slot and first lower slot extending through the given thickness of the rear wall from the front surface of the rear wall to the rear surface of the rear wall, a parallel second strap retaining opening divided by a dividing wall into a second upper slot and a second lower slot, with each respective first lower slot and second lower slot extending through the given thickness of the rear wall from the front surface of the rear wall to the rear surface of the rear wall, the main body further including an upper wall, a lower wall, a first sidewall and a second sidewall which upper wall, lower wall, first and second sidewall and rear wall form an interior chamber to retain the cell phone, the first upper slot and first lower slot are parallel to and adjacent to the upper wall and the second upper slot and second lower slot are parallel to and adjacent the lower wall; (b) an elongated low profile adjustable strap including a first sidewall, a second sidewall, a first end, a second end, an interior surface and an exterior surface, the interior surface including a pair of spaced apart fasteners which are a first fastener adjacent the first end and a second fastener adjacent the second end, the interior surface further including an elongated fastener extending over a portion of the interior surface between the first and second fasteners and separated from the first fastener by a first gap and separated from the second fastener by a second gap, a pull tab affixed to the upper surface and adjacent the second end; and (c) the elongated low profile adjustable strap having its second end fed into the second retaining strap opening by the elongated low profile adjustable strap's interior surface fed through the second upper slot and rotated so that it is fed back through the second lower slot around the dividing wall and the strap's upper surface extends out behind the cell phone protector case rear surface so that the second fastener is affixed to a portion of the elongated fastener, the first end of the elongated low profile adjustable strap is fed into the upper retaining opening by the strap's interior surface fed through the second upper slot and rotated so that it is fed back around the dividing wall and through the first upper slot and extends out behind the cell phone protector case rear surface so that the first fastener is affixed to a portion of the elongated fastener, so when used in conjunction with a person's hand, the hand is placed between an exterior surface of the interior surface of the elongated low profile adjustable strap and the rear surface of the cell phone protector case and tightened by adjusting the elongated low profile adjustable strap by adjusting the location of either the first or second fastener relative to the elongated fastener to assure a tightened grasp of the cell phone protector case by the person's hand.

A second definition of the present invention is a cell phone protector case to be used in conjunction with a cell phone retained in the cell phone protector case and in conjunction with a user's body part, comprising: (a) a main body having a rear wall having a given thickness from a front surface of the rear wall to a rear surface of the rear wall, including a first right transverse retaining strap opening divided by a dividing wall into a first right transverse slot and a second right transverse slot, with each respective first right transverse slot and second right transverse slot extending through the given thickness of the rear wall from the front surface of the rear wall to the rear surface of the rear wall, a parallel first left transverse strap retaining opening divided by a dividing wall into a first left transverse slot and a second left transverse slot, with each respective first left transverse slot and second left transverse slot extending through the given thickness of the rear wall from the front surface of the rear wall to the rear surface of the rear wall, the main body further including an upper wall, a lower wall, a first sidewall and a second sidewall which upper wall, lower wall, first and second sidewall and rear wall form an interior chamber to retain the cell phone, the first right transverse slot and second right transverse slot are parallel to and adjacent the first sidewall and the first left transverse slot and second left transverse slot are parallel to and adjacent the second sidewall; (b) an elongated low profile adjustable strap including a first sidewall, a second sidewall, a first end, a second end, an interior surface and an exterior surface, the interior surface including a pair of spaced apart fasteners which are a first fastener adjacent the first end and a second fastener adjacent the second end, the interior surface further including an elongated fastener extending over a portion of the interior surface between the first and second fasteners and separated from the first fastener by a first gap and separated from the second fastener by a second gap, a pull tab affixed to the upper surface and adjacent the second end; and (c) the elongated low profile adjustable strap having its second end fed into the first right transverse strap retaining opening by the strap's interior surface fed through the second right transverse slot and rotated so that it is fed back through the first right transverse slot around the dividing wall and the strap's upper surface extends out behind the cell phone protector case rear surface so that the second fastener is affixed to a portion of the elongated fastener, the first end of the elongated adjustable low profile strap is fed into the left transverse strap retaining opening by the strap's interior surface fed through the second left transverse slot and rotated so that it is fed back around the dividing wall and through the first left transverse slot and extends out behind the cell phone protector case rear surface so that the first fastener is affixed to a portion of the elongated fastener, so when used in conjunction with a person's body part, the body part is placed between an exterior surface of the interior surface of the elongated low profile adjustable strap and the rear surface of the cell phone protector case and tightened by adjusting the elongated low profile adjustable strap by adjusting the location of either the first or second fastener relative to the elongated fastener to assure a tightened retention of the cell phone protector case on the person's body part.

The broadest definition of the present invention is a cell phone protector case to be used in conjunction with a cell phone retained in the cell phone protector case and in conjunction with a user's body part, comprising: (a) a main body having a rear wall having a given thickness from a front surface of the rear wall to a rear surface of the rear wall, including a first retaining strap opening divided by a dividing wall into a first slot and a second slot, with each first slot and second slot extending through the given thickness of the rear wall from the front surface of the rear wall to the rear surface of the rear wall, a parallel second strap retaining opening divided by a dividing wall into a first slot and a second slot, with each respective first slot and second slot extending through the given thickness of the rear wall from the front surface of the rear wall to the rear surface of the rear wall, the main body further including walls when combined with the rear wall form an interior chamber to retain the cell phone; (b) an elongated low profile adjustable strap including a first end, a second end, an interior surface and an exterior surface, the interior surface including a pair of spaced apart fasteners which are a first fastener adjacent the first end and a second fastener adjacent the second end, the interior surface further including an elongated fastener extending over a portion of the interior surface between the first and second fasteners and separated from the first fastener by a first gap and separated from the second fastener by a second gap; and (c) the elongated low profile adjustable strap having its first end fed into the first retaining opening by the strap's interior surface fed through the second slot and rotated so that it is fed back through the first slot around the dividing wall and the strap's upper surface extends out behind the cell phone protector case rear surface so that the first fastener is affixed to a portion of the elongated fastener, the second end of the elongated adjustable low profile strap is fed into the second retaining opening by the strap's interior surface fed through the second slot and rotated so that it is fed back around the dividing wall and through the first slot and extends out behind the cell phone protector case rear surface so that the second fastener is affixed to a portion of the elongated fastener, so when used in conjunction with a person's body part, the body part is placed between an exterior portion of the interior surface of the elongated low profile adjustable strap and the rear surface of the cell phone protector case and tightened by adjusting the elongated low profile adjustable strap by adjusting the location of either the first or second fastener relative to the elongated fastener to assure a tightened grasp of the cell phone protector case by the person's body part.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A cell phone protector case including a cell phone retained in the cell phone protector case and used in conjunction with a user's hand having at least a front palm and a rear surface, comprising:

a. a main body having a rear wall including a front surface and a rear surface, including a first retaining strap opening divided by a dividing wall into a first upper slot and a first lower slot, with each respective first upper slot and first lower slot extending through the rear wall from the front surface to the rear surface, a parallel second strap retaining opening divided by a dividing wall into a second upper slot and a second lower slot, with each respective first upper slot, first lower slot, second upper slot and second lower slot extending through the rear wall from the front surface to the rear surface, the main body further including an upper wall, a lower wall, a first sidewall and a second sidewall which upper wall, lower wall, first and second sidewall and rear wall form an interior chamber to retain the cell phone, the first upper slot and first lower slot are parallel to and adjacent to the upper wall and the second upper slot and second lower slot are parallel to and adjacent the lower wall;

b. an elongated adjustable strap including a first sidewall, a second sidewall, a first end, a second end, an interior surface and an exterior surface, the interior surface including a pair of spaced apart fasteners which are a first fastener adjacent the first end and a second fastener adjacent the second end, the interior surface further including an elongated fastener extending over a portion of the interior surface between the first and second fasteners and separated from the first fastener by a first gap and separated from the second fastener by a second gap, a pull tab affixed to the upper surface and adjacent the second end; and c. the elongated adjustable strap having its second end fed into the second retaining strap opening by the elongated adjustable strap's interior surface fed through the second upper slot and rotated and fed back through the second lower slot around the dividing wall and the strap's upper surface extends out behind the cell phone protector case rear surface and the second fastener is affixed to a portion of the elongated fastener, the first end of the elongated adjustable strap is fed into the upper retaining opening by the strap's interior surface fed through the first lower slot and rotated and fed back around the dividing wall and through the first upper slot and extends out behind the cell phone protector case rear surface and the first fastener is affixed to a portion of the elongated fastener;

d. whereby, the user's hand is placed between the elongated adjustable strap and the rear surface of the cell phone protector case with at least the user's front palm against the rear surface of the cell phone protector case and the rear surface of the user's hand against the elongated adjustable strap, and the elongated adjusted strap tightened by adjusting the elongated adjustable strap by adjusting the location of either the first or second fastener relative to the elongated fastener to assure a tightened grasp of the cell phone protector case by the person's hand.

2. A cell phone protector case in accordance with claim 1, further comprising:

a. the first fastener is a hook fastener;

b. the second fastener is a hook fastener; and c. the elongated fastener is a loop fastener.

3. A cell phone protector case in accordance with claim 1, further comprising:

a. the first fastener is a loop fastener;

b. the second fastener is a loop fastener; and c. the elongated fastener is a hook fastener.

4. The cell phone protector case in accordance with claim 1, further comprising:

a. the cell phone protector case including the rear wall, upper wall, lower wall, first sidewall and second sidewall are made of dual thermoplastic polyurethane.

5. The cell phone protector case in accordance with claim 1, further comprising: the rear surface includes zig-zag patterns to facilitate a hand grip on the cell phone protector case.

6. A cell phone protector case including a cell phone retained in the cell phone protector case and used in conjunction with a user's body part selected from the group consisting of an upper arm, a lower right arm, an upper left arm, a lower left arm, a right leg and a left leg, comprising:

a. a main body having a rear wall including a front surface and a rear surface, including a first right transverse retaining strap opening divided by a dividing wall into a first right transverse slot and a second right transverse slot, with each respective first right transverse slot and second right transverse slot extending from the front surface of the rear wall to the rear surface of the rear wall, a parallel first left transverse strap retaining opening divided by a dividing wall into a first left transverse slot and a second left transverse slot, with each respective first left transverse slot and second left transverse slot extending from the front surface of the rear wall to the rear surface of the rear wall, the main body further including an upper wall, a lower wall, a first sidewall and a second sidewall which upper wall, lower wall, first and second sidewall and rear wall form an interior chamber to retain the cell phone, the first right transverse slot and second right transverse slot are parallel to and adjacent the first sidewall and the first left transverse slot and second left transverse slot are parallel to and adjacent the second sidewall;

b. an elongated adjustable strap including a first sidewall, a second sidewall, a first end, a second end, an interior surface and an exterior surface, the interior surface including a pair of spaced apart fasteners which are a first fastener adjacent the first end and a second fastener adjacent the second end, the interior surface further including an elongated fastener extending over a portion of the interior surface between the first and second fasteners and separated from the first fastener by a first gap and separated from the second fastener by a second gap, a pull tab affixed to the upper surface and adjacent the second end; and c. the elongated adjustable strap having its second end fed into the first right transverse strap retaining opening by the strap's interior surface fed through the second right transverse slot and rotated and fed back through the first right transverse slot around the dividing wall and the strap's upper surface extends out behind the cell phone protector case rear surface and the second fastener is affixed to a portion of the elongated fastener, the first end of the elongated adjustable strap is fed into the left transverse strap retaining opening by the strap's interior surface fed through the second left transverse slot and rotated and is fed back around the dividing wall and through the first left transverse slot and extends out behind the cell phone protector case rear surface and the first fastener is affixed to a portion of the elongated fastener;

d. whereby, a selected one of the user's body part selected from the group consisting of the upper right arm, the lower right arm, the upper left arm, the lower left arm, the right leg and the left leg is placed between the elongated adjustable strap and the rear surface of the cell phone protector case with the selected user's body part inserted between the rear surface of the cell phone protector case and the rear surface of the elongated adjustable strap, and the elongated adjustable strap is tightened by adjusting the elongated adjustable strap by adjusting the location of either the first or second fastener relative to the elongated fastener to assure a tightened retention of the cell phone protector case around the selected user's body part.

7. A cell phone protector case in accordance with claim 6, further comprising:

a. the first fastener is a hook fastener;
b. the second fastener is a hook fastener; and
c. the elongated fastener is a loop fastener.

8. A cell phone protector case in accordance with claim 6, further comprising:

a. the first fastener is a loop fastener;
b. the second fastener is a loop fastener; and
c. the elongated fastener is a hook fastener.

9. The cell phone protector case in accordance with claim 6, further comprising:

a. the cell phone protector case including the rear wall, upper wall, lower wall, first sidewall and second sidewall are made of dual thermoplastic polyurethane.

10. The cell phone protector case in accordance with claim 6, further comprising: the body part is selected from the group consisting of a right upper arm, a right lower arm, a right leg, a left upper arm, a left lower arm and a left leg.

11. A cell phone protector case including a cell phone retained in the cell phone protector case and used in conjunction with a user's body part selected from the group consisting of an upper arm, a lower right arm, an upper left arm, a lower left arm, a right leg and a left leg, comprising:

a. a main body having a rear wall including a front surface and a rear surface, including a first retaining strap opening divided by a dividing wall into a first upper slot and a first lower slot, with each respective first upper slot and first lower slot extending through the rear wall from the front surface to the rear surface, a parallel second strap retaining opening divided by a dividing wall into a second upper slot and a second lower slot, with each respective first upper slot, first lower slot, second upper slot and second lower slot extending through the rear wall from the front surface to the rear surface, the main body further including an upper wall, a lower wall, a first sidewall and a second sidewall which upper wall, lower wall, first and second sidewall and rear wall form an interior chamber to retain the cell phone, the first upper slot and first lower slot are parallel to and adjacent to the upper wall and the second upper slot and second lower slot are parallel to and adjacent the lower wall;

b. an elongated adjustable strap including a first sidewall, a second sidewall, a first end, a second end, an interior surface and an exterior surface, the interior surface including a pair of spaced apart fasteners which are a first fastener adjacent the first end and a second fastener adjacent the second end, the interior surface further including an elongated fastener extending over a portion of the interior surface between the first and second fasteners and separated from the first fastener by a first gap and separated from the second fastener by a second gap, a pull tab affixed to the upper surface and adjacent the second end; and c. the elongated adjustable strap having its second end fed into the second retaining strap opening by the elongated adjustable strap's interior surface fed through the second upper slot and rotated and fed back through the second lower slot around the dividing wall and the strap's upper surface extends out behind the cell phone protector case rear surface and the second fastener is affixed to a portion of the elongated fastener, the first end of the elongated adjustable strap is fed into the upper retaining opening by the strap's interior surface fed through the first lower slot and rotated and fed back around the dividing wall and through the first upper slot and extends out behind the cell phone protector case rear surface and the first fastener is affixed to a portion of the elongated fastener;

d. whereby, a selected one of the user's body part selected from the group consisting of the upper right arm, the lower right arm, the upper left arm, the lower left arm, the right leg and the left leg is placed between the elongated adjustable strap and the rear surface of the cell phone protector case with the selected user's body part inserted between the rear surface of the cell phone protector case and the rear surface of the elongated adjustable strap, and the elongated adjusted strap is tightened by adjusting the elongated adjustable strap by adjusting the location of either the first or second fastener relative to the elongated fastener to assure a tightened retention of the cell phone protector case around the selected user's body part.

12. A cell phone protector case in accordance with claim 11, further comprising:

a. the first fastener is a hook fastener;

b. the second fastener is a hook fastener; and c. the elongated fastener is a loop fastener.

13. A cell phone protector case in accordance with claim 11, further comprising:

a. the first fastener is a loop fastener;

b. the second fastener is a loop fastener; and c. the elongated fastener is a hook fastener.

14. The cell phone protector case in accordance with claim 11, further comprising:

a. the cell phone protector case including the rear wall, upper wall, lower wall, first sidewall and second sidewall are made of dual thermoplastic polyurethane.

15. The cell phone protector case in accordance with claim 11, further comprising: the rear surface includes zig-zag patterns to facilitate a hand grip on the cell phone protector case.

16. A cell phone protector case including a cell phone retained in the cell phone protector case and used in conjunction with a user's hand having at least a palm and a rear surface, a. a main body having a rear wall including a front surface and a rear surface, including a first right transverse retaining strap opening divided by a dividing wall into a first right transverse slot and a second right transverse slot, with each respective first right transverse slot and second right transverse slot extending from the front surface of the rear wall to the rear surface of the rear wall, a parallel first left transverse strap retaining opening divided by a dividing wall into a first left transverse slot and a second left transverse slot, with each respective first left transverse slot and second left transverse slot extending from the front surface of the rear wall to the rear surface of the rear wall, the main body further including an upper wall, a lower wall, a first sidewall and a second sidewall which upper wall, lower wall, first and second sidewall and rear wall form an interior chamber to retain the cell phone, the first right transverse slot and second right transverse slot are parallel to and adjacent the first sidewall and the first left transverse slot and second left transverse slot are parallel to and adjacent the second sidewall;

b. an elongated adjustable strap including a first sidewall, a second sidewall, a first end, a second end, an interior surface and an exterior surface, the interior surface including a pair of spaced apart fasteners which are a first fastener adjacent the first end and a second fastener adjacent the second end, the interior surface further including an elongated fastener extending over a portion of the interior surface between the first and second fasteners and separated from the first fastener by a first gap and separated from the second fastener by a second gap, a pull tab affixed to the upper surface and adjacent the second end; and c. the elongated adjustable strap having its second end fed into the first right transverse strap retaining opening by the strap's interior surface fed through the second right transverse slot and rotated and fed back through the first right transverse slot around the dividing wall and the strap's upper surface extends out behind the cell phone protector case rear surface and the second fastener is affixed to a portion of the elongated fastener, the first end of the elongated adjustable strap is fed into the left transverse strap retaining opening by the strap's interior surface fed through the second left transverse slot and rotated and is fed back around the dividing wall and through the first left transverse slot and extends out behind the cell phone protector case rear surface and the first fastener is affixed to a portion of the elongated fastener;

d. whereby, the user's hand is placed between the elongated adjustable strap and the rear surface of the cell phone protector case with at least the user's front palm against the rear surface of the cell phone protector case and the rear surface of the user's hand against the elongated adjustable strap, and the elongated adjusted strap tightened by adjusting the elongated adjustable strap by adjusting the location of either the first or second fastener relative to the elongated fastener to assure a tightened grasp of the cell phone protector case.

17. A cell phone protector case in accordance with claim 16, further comprising:

a. the first fastener is a hook fastener;

b. the second fastener is a hook fastener; and c. the elongated fastener is a loop fastener.

18. A cell phone protector case in accordance with claim 16, further comprising:

a. the first fastener is a loop fastener;

b. the second fastener is a loop fastener; and c. the elongated fastener is a hook fastener.

19. The cell phone protector case in accordance with claim 16, further comprising:

a. the cell phone protector case including the rear wall, upper wall, lower wall, first sidewall and second sidewall are made of dual thermoplastic polyurethane.

20. The cell phone protector case in accordance with claim 16, further comprising: the body part is selected from the group consisting of a right upper arm, a right lower arm, a right leg, a left upper arm, a left lower arm and a left leg.

* * * * *